(12) United States Patent
Matsuda et al.

(10) Patent No.: US 10,776,445 B2
(45) Date of Patent: Sep. 15, 2020

(54) APPARATUS AND A METHOD FOR REFERENCE LIST PRIORITIZATION

(75) Inventors: Atsuyoshi Matsuda, Shinagawa-ku (JP); Fumihiro Kawasaki, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 65 days.

(21) Appl. No.: 14/360,862

(22) PCT Filed: Jun. 28, 2012

(86) PCT No.: PCT/JP2012/066537
§ 371 (c)(1),
(2), (4) Date: Jul. 10, 2014

(87) PCT Pub. No.: WO2013/080598
PCT Pub. Date: Jun. 6, 2013

(65) Prior Publication Data
US 2014/0359416 A1    Dec. 4, 2014

(30) Foreign Application Priority Data
Nov. 30, 2011 (JP) ................ 2011-262036

(51) Int. Cl.
*G06F 16/955* (2019.01)
*G06F 16/9535* (2019.01)

(52) U.S. Cl.
CPC ...... *G06F 16/9562* (2019.01); *G06F 16/9535* (2019.01); *G06F 16/9566* (2019.01)

(58) Field of Classification Search
CPC .............................. G06F 17/30884
USPC .......................................... 715/206
See application file for complete search history.

(56) References Cited

U.S. PATENT DOCUMENTS

| | | | |
|---|---|---|---|
| 6,574,625 B1 * | 6/2003 | Bates ............... | G06F 16/9562 707/749 |
| 7,133,859 B1 * | 11/2006 | Wong ............... | G06Q 10/10 |
| 7,295,995 B1 * | 11/2007 | York ............... | G06Q 30/02 705/26.8 |

(Continued)

FOREIGN PATENT DOCUMENTS

| JP | 10-143519 A | 5/1998 |
|---|---|---|
| JP | 10-334120 A | 12/1998 |

(Continued)

OTHER PUBLICATIONS

John Walkenbach, Excel 2010 Bible, John Wiley & Sons, published Jun. 2010, p. 108, 197, 640, 708-709 and 930.*

(Continued)

*Primary Examiner* — Frank D Mills
(74) *Attorney, Agent, or Firm* — Sughrue Mion, PLLC

(57) ABSTRACT

Provided is an apparatus and method which prioritizes transaction objects included on a reference list. The reference list contains transaction object information corresponding to the transaction objects. The apparatus stores a user's history of actions performed on the transaction objects and an interest parameter based on the user's history of actions. The interest parameter is used to select one or more transaction objects. The apparatus displays the reference list in an order prioritizing the selected transaction objects over non-selected transaction objects.

29 Claims, 11 Drawing Sheets

(56) References Cited

U.S. PATENT DOCUMENTS

| | | | | |
|---|---|---|---|---|
| 7,356,490 B1* | 4/2008 | Jacobi | G06F 17/30867 | 705/26.8 |
| 7,647,309 B1* | 1/2010 | Bar | G06Q 30/06 | 705/26.1 |
| 7,756,753 B1* | 7/2010 | McFarland | G06Q 30/02 | 705/26.1 |
| 7,809,601 B2* | 10/2010 | Shaya | G06Q 30/02 | 700/233 |
| 7,831,439 B1* | 11/2010 | Bryar | G06Q 10/00 | 235/381 |
| 7,831,548 B1* | 11/2010 | Round | G06F 17/30893 | 707/609 |
| 7,836,051 B1* | 11/2010 | Mason | G06F 16/9535 | 707/734 |
| 7,899,829 B1* | 3/2011 | Malla | G06F 16/9562 | 707/741 |
| 7,991,758 B2* | 8/2011 | Beeston | G06F 3/0611 | 707/706 |
| 8,190,486 B1* | 5/2012 | Ouimet | G06Q 30/02 | 705/26.1 |
| 8,250,012 B1* | 8/2012 | Whitman | G06Q 30/02 | 706/45 |
| 8,577,753 B1* | 11/2013 | Vincent | G06Q 30/02 | 705/26.1 |
| 8,612,312 B1* | 12/2013 | Edwards | G06Q 30/0633 | 705/26.8 |
| 2002/0010625 A1* | 1/2002 | Smith | G06Q 30/02 | 705/14.52 |
| 2003/0105682 A1* | 6/2003 | Dicker | G06Q 30/02 | 705/26.8 |
| 2003/0115333 A1* | 6/2003 | Cohen | G06F 17/3089 | 709/227 |
| 2005/0033650 A1* | 2/2005 | Robertson | G06Q 30/02 | 705/26.8 |
| 2006/0282304 A1* | 12/2006 | Bedard | G06F 17/30867 | 705/7.33 |
| 2007/0271149 A1* | 11/2007 | Siegel | G06Q 30/0641 | 705/26.41 |
| 2008/0059281 A1* | 3/2008 | Tower | G06Q 30/02 | 715/230 |
| 2008/0059521 A1* | 3/2008 | Hutson | G06F 17/30873 | |
| 2008/0115168 A1* | 5/2008 | Adwankar | H04N 7/17318 | 725/46 |
| 2009/0019053 A1* | 1/2009 | Burgess | G06Q 30/06 | |
| 2009/0100076 A1* | 4/2009 | Hamilton, II | G06Q 30/02 | |
| 2010/0076857 A1* | 3/2010 | Deo | G06Q 30/00 | 705/26.1 |
| 2010/0082566 A1* | 4/2010 | Wang | G06F 17/30648 | 707/705 |
| 2010/0191619 A1* | 7/2010 | Dicker | G06Q 30/02 | 705/26.1 |
| 2011/0191181 A1* | 8/2011 | Blackhurst | G06Q 30/0269 | 705/14.53 |
| 2011/0208732 A1* | 8/2011 | Melton | G06F 16/955 | 707/728 |
| 2011/0307411 A1* | 12/2011 | Bolivar | G06Q 30/0282 | 705/347 |
| 2012/0084122 A1* | 4/2012 | Boehle | G06Q 30/0207 | 705/14.1 |
| 2012/0089621 A1* | 4/2012 | Liu | G06F 17/30699 | 707/749 |
| 2012/0158480 A1* | 6/2012 | Sundaram | G06Q 10/087 | 705/14.23 |
| 2012/0284145 A1* | 11/2012 | Kalin | G06Q 30/0631 | 705/26.7 |
| 2013/0006803 A1* | 1/2013 | Oskolkov | G06Q 30/02 | 705/26.8 |
| 2013/0185175 A1* | 7/2013 | Roozen | G06Q 30/0629 | 705/26.64 |
| 2014/0344093 A1* | 11/2014 | Du | G06Q 30/06 | 705/26.2 |

FOREIGN PATENT DOCUMENTS

| | | |
|---|---|---|
| JP | 11-120109 A | 4/1999 |
| JP | 2001-297254 A | 10/2001 |
| JP | 2003-091470 A | 3/2003 |
| JP | 2003-228584 A | 8/2003 |
| JP | 2004-341626 A | 12/2004 |
| JP | 2010-134854 A | 6/2010 |

OTHER PUBLICATIONS

Bateman, Scott, Michael J. Muller, and Jill Freyne. "Personalized retrieval in social bookmarking." In Proceedings of the ACM 2009 international conference on Supporting group work, pp. 91-94. 2009. (Year: 2009).*

Notification of Reason for Rejection, 2011-262036, dated Apr. 30, 2014.

International Search Report for PCT/JP2012/066537, dated Jul. 31, 2012.

* cited by examiner

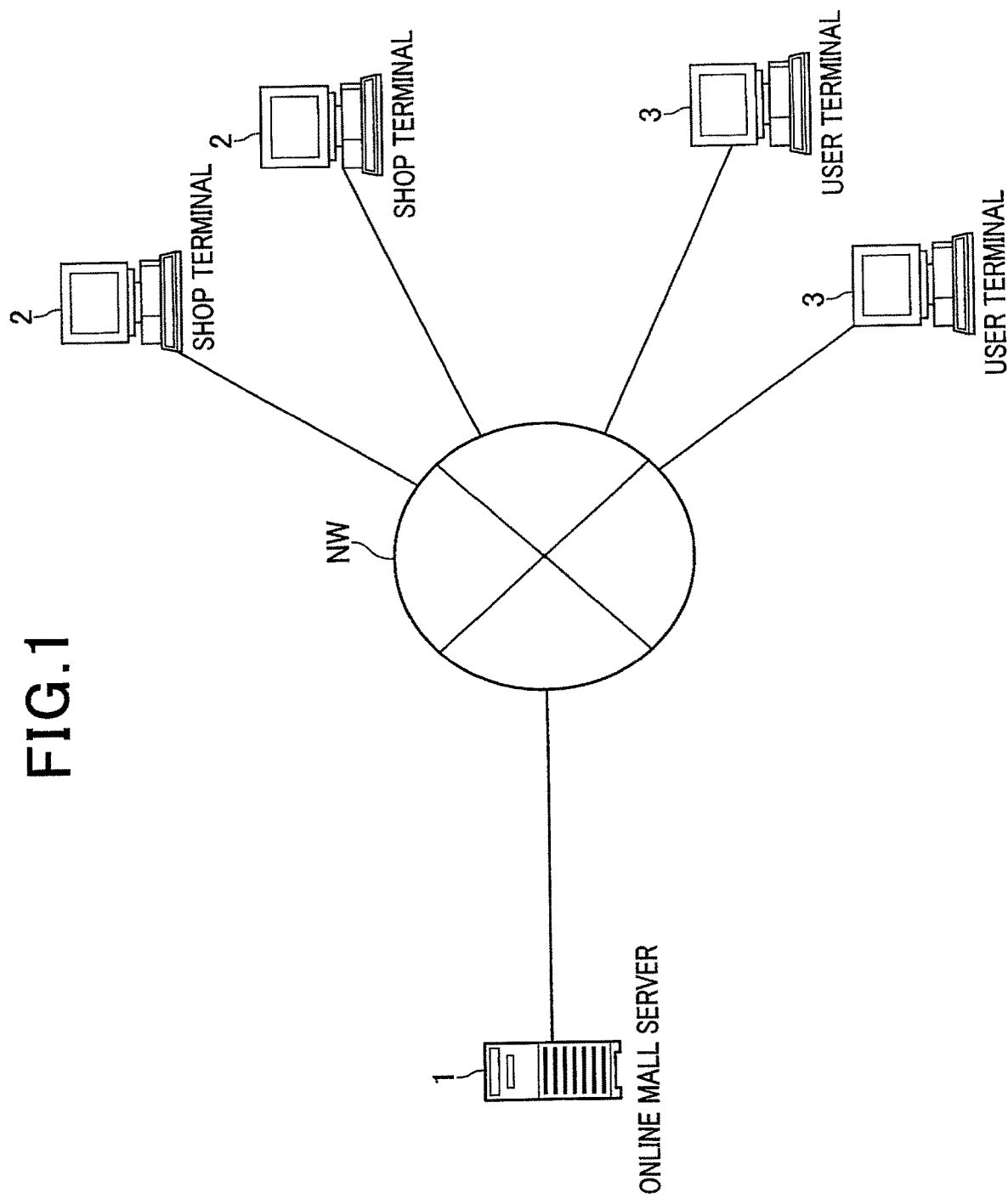

FIG.2

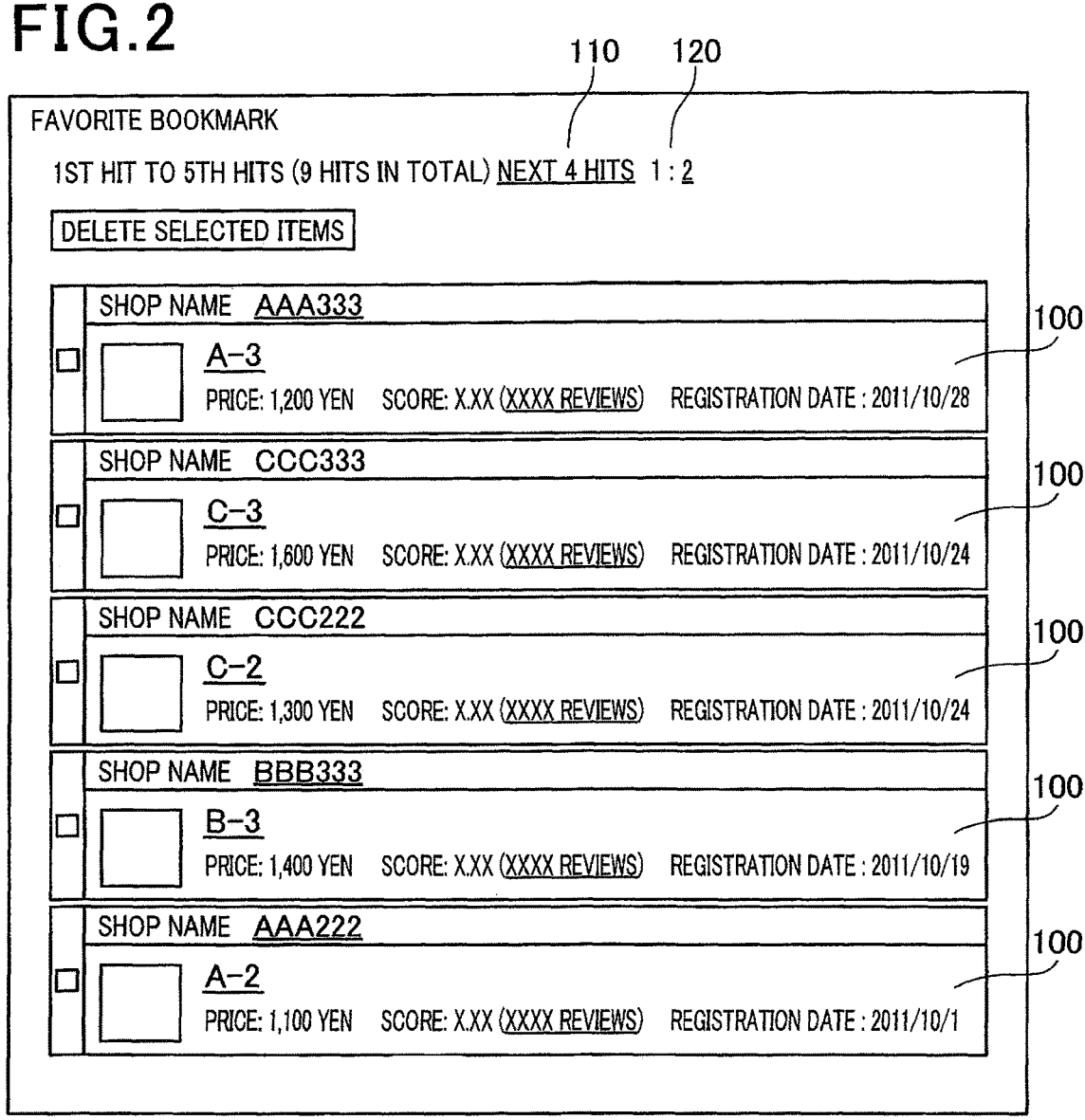

FAVORITE BOOKMARK

1ST HIT TO 5TH HITS (9 HITS IN TOTAL) NEXT 4 HITS 1 : 2

110, 120

[DELETE SELECTED ITEMS]

- SHOP NAME  AAA333
  - A-3
  - PRICE: 1,200 YEN   SCORE: X.XX (XXXX REVIEWS)   REGISTRATION DATE : 2011/10/28
- SHOP NAME  CCC333
  - C-3
  - PRICE: 1,600 YEN   SCORE: X.XX (XXXX REVIEWS)   REGISTRATION DATE : 2011/10/24
- SHOP NAME  CCC222
  - C-2
  - PRICE: 1,300 YEN   SCORE: X.XX (XXXX REVIEWS)   REGISTRATION DATE : 2011/10/24
- SHOP NAME  BBB333
  - B-3
  - PRICE: 1,400 YEN   SCORE: X.XX (XXXX REVIEWS)   REGISTRATION DATE : 2011/10/19
- SHOP NAME  AAA222
  - A-2
  - PRICE: 1,100 YEN   SCORE: X.XX (XXXX REVIEWS)   REGISTRATION DATE : 2011/10/1

FIG.3

| ITEM NAME | GENRE | PRICE |
|---|---|---|
| A-3 | FOODS | 1,200 YEN |
| C-3 | BOOKS | 1,600 YEN |
| C-2 | BOOKS | 1,300 YEN |
| B-3 | STATIONERY | 1,400 YEN |
| A-2 | FOODS | 1,100 YEN |
| C-1 | BOOKS | 1,000 YEN |
| B-2 | STATIONERY | 1,200 YEN |
| A-1 | FOODS | 1,000 YEN |
| B-1 | STATIONERY | 1,000 YEN |

FIG.6A
MEMBERSHIP INFORMATION DB 12a

| |
|---|
| USER ID |
| PASSWORD |
| NICKNAME |
| DATE OF BIRTH |
| GENDER |
| ZIP CODE |
| ADDRESS |
| TELEPHONE NUMBER |
| EMAIL ADDRESS |
| HOLDING POINT AMOUNT |

FIG.6B
GENRE INFORMATION DB 12b

| |
|---|
| GENRE ID |
| GENRE NAME |
| LEVEL |
| PARENT GENRE ID |
| CHILD GENRE ID LIST |

FIG.6C
SHOP INFORMATION DB 12c

| |
|---|
| SHOP ID |
| SHOP NAME |
| ZIP CODE |
| ADDRESS |
| TELEPHONE NUMBER |
| EMAIL ADDRESS |

FIG.6D
ITEM INFORMATION DB 12d

| |
|---|
| ITEM ID |
| SHOP ID |
| ITEM CODE |
| GENRE ID |
| ITEM NAME |
| ITEM IMAGE URL |
| ITEM DESCRIPTION |
| ITEM PRICE |

FIG.6E
QUERY LOG DB 12e

| |
|---|
| RECEPTION DATE AND TIME |
| SEARCH CONDITION INFORMATION |
| USER ID |

FIG.6F
BROWSING HISTORY DB 12f

| |
|---|
| BROWSING DATE AND TIME |
| URL |
| USER ID |
| BROWSING PERIOD |

FIG.6G
BOOKMARK INFORMATION DB 12g

| |
|---|
| USER ID |
| ITEM ID |
| REGISTRATION DATE AND TIME |

APPARATUS AND A METHOD FOR REFERENCE LIST PRIORITIZATION

CROSS REFERENCE TO RELATED APPLICATIONS

This application is a National Stage of International Application No. PCT/JP2012/066537 filed Jun. 28, 2012, claiming priority based on Japanese Patent Application No. 2011-262036 filed Nov. 30, 2011 the contents of all of which are incorporated herein by reference in their entirety.

TECHNICAL FIELD

The present invention relates to the technical field of information processing apparatuses that perform a process associated with displaying of a reference list that stores references to information on a transaction object.

BACKGROUND ART

In the past, there has been known electronic commerce web site in which users can purchase transaction objects such as purchase of items or reservations of services. Such a web site provides a web page which posts information on each transaction object. Moreover, such a web site often provides a function that allows users to register an optional transaction object in a reference list. The reference list is, for example, a list that stores references to information on a transaction object such as a URL of information on the transaction object. Examples of the reference list include a favorite, a bookmark, and the like. Another example of the reference list includes a browsing history of a web page that posts information on a transaction object.

When a user wants to browse information on a transaction object registered in the reference list, the user displays the reference list on a screen and selects a transaction object that the user wants to obtain information thereof. Then, a web page that posts information on the selected transaction object is displayed on the screen. In this way, the user can easily access information on the transaction object from the reference list. However, if the number of transaction objects registered in the reference list increases, it may cost time and labor for the user to find a desired transaction object from the reference list.

To solve this problem, Patent Literature 1 discloses a technique that allows users to easily designate a target homepage regardless of the number of entries of a bookmark. Specifically, an Internet browser arranges bookmark entries in the bookmark in the order of reference dates of the homepages or reference frequencies or in alphabetical order of the address names of homepages. Moreover, the users can arbitrarily set the arrangement method.

PRIOR ART LITERATURE

Patent Literature

Patent Literature 1: JP 10-334120 A

SUMMARY OF THE INVENTION

Problem to be Solved by the Invention

However, even if the technique of Patent Literature 1 is applied to the reference list of transaction objects, it cannot be said that the user can easily find a transaction object that the user wants to obtain information thereof from the reference list. This is because it cannot be said that the display of the reference list in the order of reference dates or reference frequencies or in alphabetical order reflects the interest of the user in the transaction object at the time when the reference list is displayed. For example, even if the user were interested in the transaction object when referring to the information on the transaction object, the user may have lost interest in the transaction object. Thus, the user may not be interested in a transaction object of which the display rank is on the higher rank at the time when the reference list is displayed. When the respective arrangement methods cannot be said to reflect the user's interest, even if the user is allowed to arbitrarily set the arrangement method, the user may not easily find a transaction object that the user wants to obtain information thereof.

The present invention has been made in view of the above problems and is directed to provide an information processing apparatus, an information processing method, an information processing program, and a recording medium, which can allow a user to easily find a transaction object on which the user wants to obtain information from a reference list.

Means for Solving the Problem

In order to solve the above problem, the invention according to claim 1 is an information processing apparatus, comprising:

a specifying means that specifies an interest object of a user based on a history of actions of the user on a transaction object, which is stored in a history storing means;

a selecting means that selects a transaction object related to the interest object specified by the specifying means among transaction objects registered in a reference list that stores references to transaction object information on a transaction object; and a controlling means that displays the reference list so that a display manner of information indicating the transaction object selected by the selecting means is more easily visible than a display manner of information indicating a transaction object that is not selected by the selecting means.

According to this invention, the information indicating the transaction object related to the interest object is displayed in an easily visible display manner. Due to this, it is possible to allow the user to find a transaction object that the user is likely to want to obtain information thereof from the transaction objects registered in the reference list easily. By doing so, it is possible to reduce the number of requests of information from the user that the user issues to find a transaction object from the reference list.

The invention according to claim 2 is the information processing apparatus according to claim 1, wherein the specifying means specifies a transaction object of which the transaction object information is browsed within a first predetermined period from a present moment as the interest object based on the history of the user browsing the transaction object information.

According to this invention, the transaction object of which the information is browsed recently is specified as the interest object. Due to this, it is possible to specify a transaction object that the user is likely to be interested in.

The invention according to claim 3 is the information processing apparatus according to claim 2, wherein the specifying means excludes a transaction object of which the length of a display period of the transaction object information is smaller than a second predetermined period from the interest object based on the history that includes the length of the display period of the transaction object information.

According to this invention, the transaction object of which the information browsing period is short is excluded from the interest object. Due to this, since information on a transaction object of which the information has been browsed recently and which is related to a transaction object that the user is less likely to be interested in is not displayed in an easily visible manner, the user can find a transaction object that the user is likely to want to obtain information thereof more easily.

The invention according to claim 4 is the information processing apparatus according to any one of claims 1 to 3, wherein the controlling means displays the reference list in such a display manner that a display rank of information indicating the transaction object selected by the selecting means is higher than a display rank of information indicating a transaction object that is not selected by the selecting means.

According to this invention, even when the number of transaction objects which are registered in the reference list and of which the pieces of information indicating the transaction objects can be displayed simultaneously is limited, it is possible to allow the user to find a transaction object that the user wants to obtain information thereof more easily.

The invention according to claim 5 is the information processing apparatus according to claim 4, wherein the controlling means displays pieces of information indicating the transaction objects selected by the selecting means in early order of registration times of the transaction objects, which is stored in a reference list information storing means that stores information for identifying transaction objects registered in the reference list and a registration time of the transaction object in the reference list in association with each other.

According to this invention, the more the user is likely to forget having registered the transaction object in the reference list, the higher the display rank of the transaction object. Due to this, it is possible to allow the user to remember that the transaction object that the user wants to obtain information thereof is registered in the reference list more easily.

The invention according to claim 6 is the information processing apparatus according to any one of claims 1 to 5, wherein the specifying means specifies a transaction object in which the user is interested, as the interest object, and the selecting means selects a transaction object that is more advantageous to the user in terms of transaction than the transaction object specified by the specifying means among transaction objects that are related to the transaction object specified by the specifying means.

According to this invention, information indicating the transaction object that is not advantageous in terms of transaction than the transaction object that the user is interested in is not displayed in an easily visible manner. Due to this, since the information of a transaction object which is related to the transaction object that the user is interested in and which is related to a transaction object that the user is less likely to be interested in is not displayed in an easily visible manner, the user can find a transaction object that the user is likely to want to obtain information thereof more easily.

The invention according to claim 7 is the information processing apparatus according to claim 1, wherein the specifying means specifies a search condition that is designated within a third predetermined period from a present moment as the interest object based on the history of the user designating the search condition used for retrieving a transaction object, and the selecting means selects a transaction object that can be retrieved by the search condition specified by the specifying means.

According to this invention, the search condition that the user has designated recently in order to retrieve a transaction object is specified as the interest object and the information on a transaction object that can be retrieved by the specified search condition is displayed in an easily visible display manner. Due to this, the user can find a transaction object that is related to the search condition that the user is interested in more easily.

The invention according to claim 8 is an information processing method, which is performed by an information processing apparatus, comprising:

a specifying step of specifying an interest object of a user based on a history of actions of the user on a transaction object, which is stored in a history storing means;

a selecting step of selecting a transaction object related to the interest object specified in the specifying step among transaction objects registered in a reference list that stores references to transaction object information on a transaction object; and a control step of displaying the reference list so that a display manner of information indicating the transaction object selected in the selecting step is more easily visible than a display manner of information indicating a transaction object that is not selected in the selecting step.

The invention according to claim 9 is an information processing program, which causes a computer included in an information processing apparatus to function as:

a specifying means that specifies an interest object of a user based on a history of actions of the user on a transaction object, which is stored in a history storing means;

a selecting means that selects a transaction object related to the interest object specified by the specifying means among transaction objects registered in a reference list that stores references to transaction object information on a transaction object; and a controlling means that displays the reference list so that a display manner of information indicating the transaction object selected by the selecting means is more easily visible than a display manner of information indicating a transaction object that is not selected by the selecting means.

The invention according to claim 10 is a recording medium computer-readably storing thereon a information processing program, which causes a computer included in an information processing apparatus to function as:

a specifying means that specifies an interest object of a user based on a history of actions of the user on a transaction object, which is stored in a history storing means;

a selecting means that selects a transaction object related to the interest object specified by the specifying means among transaction objects registered in a reference list that stores references to transaction object information on a transaction object; and a controlling means that displays the reference list so that a display manner of information indicating the transaction object selected by the selecting means is more easily visible than a display manner of information indicating a transaction object that is not selected by the selecting means.

Advantageous Effects of the Invention

According to the present invention, information indicating the transaction object related to the interest object is displayed in an easily visible display manner. Due to this, it is possible to allow the user to find a transaction object that the user is likely to want to obtain information thereof from the transaction objects registered in the reference list easily. By doing so, it is possible to reduce the number of requests of information from the user that the user issues to find a transaction object from the reference list.

BRIEF DESCRIPTION OF THE DRAWINGS

FIG. 1 is a diagram illustrating an example of a schematic configuration of an information providing system S according to the present embodiment.

FIG. 2 is a diagram illustrating a screen display example of a bookmark page.

FIG. 3 is a list table illustrating examples of items registered in a bookmark of a certain user.

FIG. 6A is a diagram illustrating an example of contents registered in a membership information DB 12a, FIG. 6B is a diagram illustrating an example of contents registered in a genre information DB 12b, FIG. 6C is a diagram illustrating an example of contents registered in a shop information DB 12c, FIG. 6D is a diagram illustrating an example of contents registered in a item information DB 12d, FIG. 6E is a diagram illustrating an example of contents registered in a query log DB 12e, FIG. 6F is a diagram illustrating an example of contents registered in a browsing history DB 12f, and FIG. 6G is a diagram illustrating an example of contents registered in a bookmark information DB 12g.

MODE FOR CARRYING OUT THE INVENTION

Figure 4:
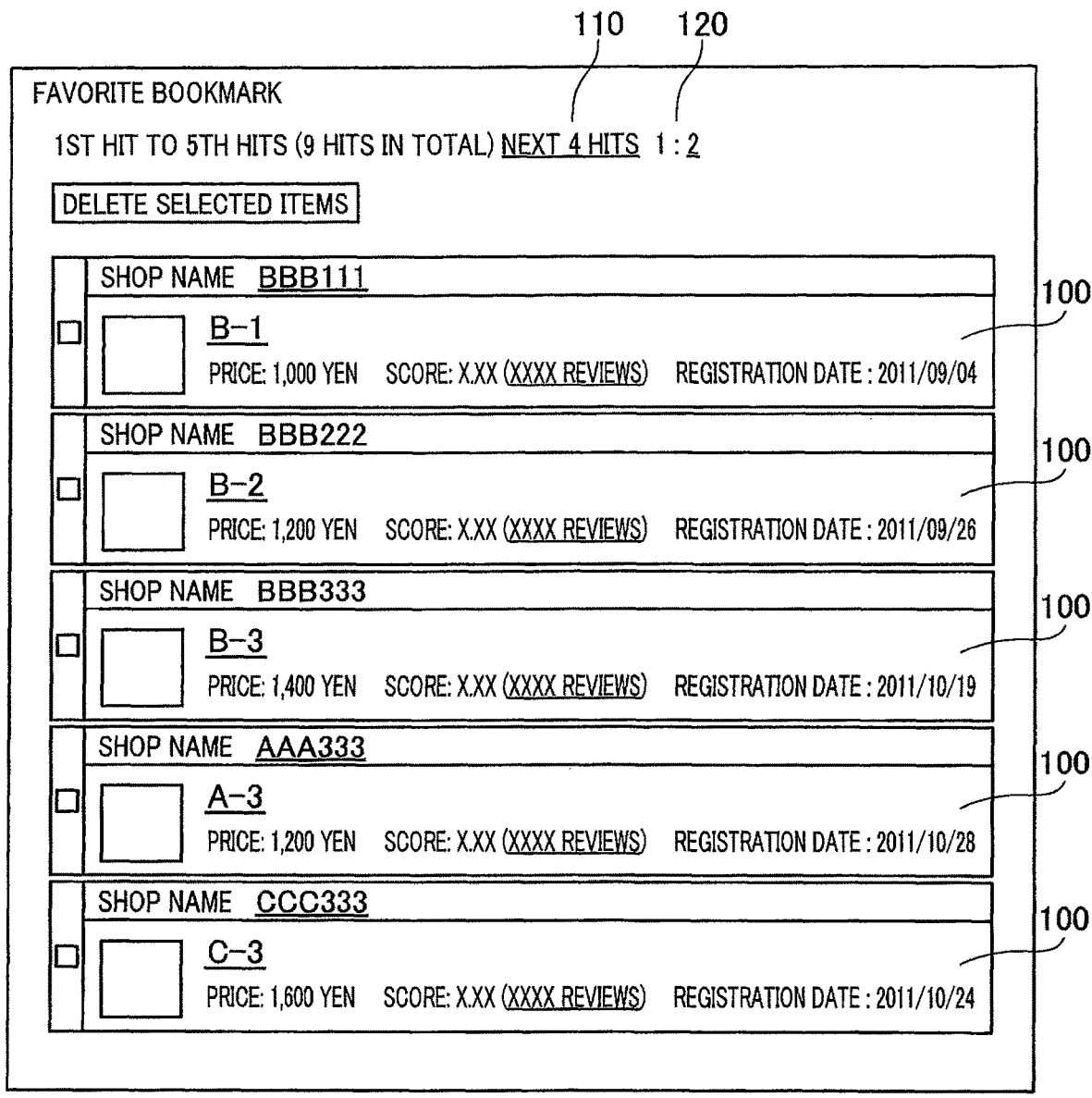
FIG. 4 is a diagram illustrating a screen display example of a bookmark page.

Hereinafter, an embodiment of the present invention will be described in detail with reference to the drawings. The embodiment described below is an embodiment when the present invention is applied to an information providing system.

1. First Embodiment

[1-1. Overview of Configuration and Function of Information Providing System]

First, the configuration of the information providing system S according to the present embodiment will be described with reference to FIG. 1. FIG. 1 is a diagram illustrating an example of a schematic configuration of the information providing system S according to the present embodiment.

As illustrated in FIG. 1, the information providing system S is configured to include an online mall server 1, a plurality of shop terminals 2, and a plurality of user terminals 3. Moreover, the online mall server 1, the respective shop terminals 2, and the respective user terminals 3 can transmit and receive data to and from each other via a network NW, for example, by using TCP/IP as a communication protocol. The network NW is constructed by, for example, Internet, a dedicated communication line (for example, a community antenna television (CATV) line), a mobile communication network (including a base station and the like), a gateway, or the like.

The online mall server 1 is a server apparatus that performs a variety of processes associated with an online mall where users can purchase items. The online mall server 1 is an example of an information processing apparatus according to the present invention. Users can purchase desired items from a desired shop using the online mall. The online mall server 1 transmits a web page of an online mall and performs processes associated with retrieving, purchasing, and the like of items, for example, in response to a request from the user terminal 3. An item is an example of a transaction object according to the present invention.

The shop terminal 2 is a terminal apparatus used by an employee or the like of a shop that is open at an online mall. The shop terminal 2 accesses a server apparatus such as the online mall server 1 based on an operation of an employee or the like. In this way, the shop terminal 2 receives a web page from the server apparatus and displays the web page. Software such as a browser or an email client is incorporated into the shop terminal 2. For example, the employee uses the shop terminal 2 to register information on items to be sold on an online mall and check the contents of an order of an item.

The user terminal 3 is a terminal apparatus of a user who uses the online mall. The user terminal 3 accesses the online mall server 1 based on an operation of a user to receive a web page from the online mall server 1 and display the web page. Software such as a browser or an email client is incorporated into the user terminal 3. A personal computer, a mobile information terminal such as a personal digital assistant (PDA) or a smartphone, a mobile phone, or the like, for example, is used as the user terminal 3.

A user can designate a search condition in order to find a purchase candidate item in an online mall. The user can designate a keyword, an item's genre, and the like, for example, as the search condition. For example, the search condition can be designated in a top page or the like. The top page is a web page at top of an online mall. When the search condition is designated, the online mall server 1 retrieves items satisfying the search condition. Specifically, the online mall server 1 retrieves items that include the designated keyword in their item name or description. Moreover, the online mall server 1 retrieves items belonging to the designated genre. When a plurality of search conditions is designated, the online mall server 1 retrieves items satisfying all search conditions. Moreover, a retrieval result page is displayed on the screen of the user terminal 3.

The retrieval result page is a web page in which a list of retrieved items is displayed. For example, in the retrieval result page, an item name, an item image, an item price, a shop name, and the like are displayed for each item. Moreover, a hyperlink (hereinafter referred to as a "link") to an item page of a retrieved item is embedded in the retrieval result page. When the user selects a link of an optional item in the retrieval result page, the corresponding item page is displayed on the screen of the user terminal 3. The item page is a web page in which detailed information on one item is displayed. The item page is an example of transaction object information according to the present invention. The user can purchase an item of which the information is displayed in the item page by performing operations for ordering the item in the item page.

The online mall provides a bookmark function. The bookmark function is a function of registering an item sold in an online mall as a bookmark of a user to store a reference to an item page in a user-dedicated list so that the user can easily browse the item page of the bookmarked item. In the online mall, a link displayed as "add to bookmark" is displayed in an item page. When a user selects this link, an item of which the information is displayed in the item page is registered in the bookmark of the user. The bookmark is an example of a reference list according to the present invention.

[1-2. Display Manner of Item Information in Bookmark Page]

The user can check items registered in the bookmark in the bookmark page. The bookmark page is a web page in which a list of items registered in the bookmark is displayed and is a dedicated web page of each user.

FIG. 2 is a diagram illustrating a screen display example of the bookmark page. As illustrated in FIG. 2, a plurality of bookmark item display regions 100 is displayed in the bookmark page. Each bookmark item display region 100 is a region in which information on a bookmarked item is displayed. Specifically, an item name, a shop name of a seller's shop of the item, an item image, an item price, an evaluation score, the number of reviews, the date when the item was registered in a bookmark are displayed in the bookmark item display region 100. The evaluation score is a value indicating the height of evaluation on the item assigned from users. Users can register reviews on items and assign evaluation scores. The evaluation score displayed in the bookmark item display region 100 is an average value of the evaluation scores assigned by respective users. The number of reviews is the number of users who had registered reviews.

A link to the corresponding item page is embedded in an item name and an item image. Thus, when the user selects an item name or an item image, the corresponding item page can be displayed. Moreover, a link to a shop page is embedded in a shop name. The shop page is a web page in which detailed information on one shop is displayed. Moreover, a link to a review list page is embedded in the number of reviews. The review list page is a web page in which a list of reviews, evaluation scores, and the like of respective users who had registered reviews on one item is displayed.

The bookmark item display regions 100 are displayed in the display ranks of the corresponding items. The higher the display rank of an item, the higher the position of the bookmark item display region 100 displayed in the bookmark page. In general, the later the bookmark registration date and time of an item, the higher the display rank. Thus, the bookmark item display regions 100 are displayed in descending order of the bookmark registration date and time of items. Moreover, the maximum number of bookmark item display regions 100 that can be displayed in one page is determined in advance. This maximum number is referred to as the maximum number of display hits. FIG. 2 illustrates a display example when the maximum number of display hits is five. Thus, even if six items or more are registered in the bookmark, the bookmark item display regions 100 of the items of which the display ranks are on the first to fifth ranks are displayed. FIG. 2 illustrates a display example when items A-3, C-3, C-2, B-3, and A-2 have been registered in that order from recent to past. The maximum number of display hits may be four or smaller and six or more. Moreover, the bookmark item display regions 100 may not be displayed in descending order of the date and time of registration to bookmark.

The online mall server 1 may rearrange the display ranks according to a select operation of a user. For example, the display ranks may be rearranged in ascending order of bookmark registration date and time, by item name, in ascending order of prices, in descending order of prices, and in other order. When the online mall server 1 rearranges the display ranks, a new bookmark page in which the respective bookmark item display regions 100 are rearranged in the new display ranks is displayed on the screen of the user terminal 3.

A next page link 110 and a page number link group 120 are also displayed in the bookmark page. The larger the number of items registered in the bookmark, the larger the number of pages of the bookmark page. For example, in the first page of the bookmark page, the bookmark item display regions 100 of items of which the display ranks are on the first to fifth ranks are displayed. Moreover, in the second page of the bookmark page, the bookmark item display regions 100 of items of which the display ranks are on the sixth to tenth ranks are displayed. The next page link 110 and the page number link group 120 are links for switching the bookmark page displayed. The next page link 110 is a link for displaying the next page of the page being displayed currently. The page number link group 120 includes at least one link indicating a page number. The respective page numbers correspond to the display ranks of items displayed in a list. The bookmark page displayed first is the first page of the bookmark page. When information on an item that the user wants to obtain is not displayed in the bookmark page displayed, the user selects the next page link 110 or the page number link group 120. In this way, the user finds the information on the item that the user wants to obtain. Examples of the case where the user wants to obtain information include a case where the user wants to browse information in an item page, a case where the user wants to browse reviews in a review list page, and a case where the user just wants to browse information in the item display region 100.

If a large number of items are registered in the bookmark, it becomes difficult for the user to find an item that the user wants to find information thereof from the bookmark page. For example, the number of pages of the bookmark page increases with the number of items registered in the bookmark. The information on the items of which the display ranks are on the first to fifth ranks only is displayed in the bookmark page displayed first. Thus, at this moment, the user cannot see information on items of which the display ranks are on the sixth rank and later. Thus, the user needs to operate the next page link 110 or the page number link group 120 to reach a bookmark page in which information on a desired item is displayed. Moreover, among a plurality of items displayed in the bookmark item display regions 100 displayed in the same page, it is more difficult to find an item of which the information is displayed on the lower side than an item of which the information is displayed on the upper side. This is because users generally scan information from top to bottom in the screen. Therefore, information displayed on the upper side is easily visible by the user. Moreover, information located on the lower side may sometimes be outside the screen and cannot be visible by the user. Thus, the user has to scroll the screen so that the information located on the lower side is displayed on the screen.

When it becomes difficult for the user to find an item that the user wants to obtain information thereof from the bookmark page, the user terminal 3 is likely to send a request to the online mall server 1. For example, whenever the user selects the next page link 110 or the page number link group 120, a new bookmark page request is transmitted from the user terminal 3 to the online mall server 1. Moreover, the user may perform an operation of rearranging the display ranks in order to display the item display region 100 of an item that the user wants to obtain information thereof. In this case, the bookmark page request is transmitted. Moreover, the user may display an item page by selecting a certain item display region 100 to check in the item page whether the item page includes information on the item that the user wants to obtain. In this case, an item page request is transmitted from the user terminal 3 to the online mall server 1. When a large number of requests are transmitted from the user terminal 3, the processing load of the online mall server 1 increases. Moreover, the network load also increases due to transmission and reception of requests, web pages, and the like. These can be the causes of delay of responses from the online mall server 1 to the user terminal 3.

Thus, the online mall server 1 raises the display rank of an item that the user is likely to want to obtain information thereof more than the display ranks of other items. This is because the bookmark item display region 100 of an item having a higher display rank is displayed in such a display manner that the region is more easily visible than that of the other item due to the above-described reasons.

Here, the online mall server 1 needs to specify an item that the user is likely to want to obtain information thereof. Thus, first, the online mall server 1 specifies an interest object of the user. The interest object is an object that the user is likely to be interested in. Examples of objects that can be an interest object include an item, a shop, a search condition, and the like. In the present embodiment, a case where the interest object is applied to an item will be described.

When a user selects an optional item among items displayed in the retrieval result page, an item page of the selected item is displayed. In this way, the user can browse information on the item. Since the item is an item that the user is interested in, it can be thought that the user has selected the item among a plurality of items as an item of which the item page is to be displayed. Moreover, it is thought that the closer to the present moment the browsing date and time of the item page, the higher the degree of interest of the user in the item, for example. Alternatively, it is thought that the closer to the present moment the browsing date and time of the item page, the longer the user will be interested in the item. Thus, the online mall server 1 specifies an item of which the item page is browsed within a predetermined interest object specifying period from the present moment when the bookmark page is displayed as an interest object. The interest object specifying period is set by, for example, an administrator or the like of the online mall. For example, the interest object specifying period may be set to a period in which the user is still interested in an item of which the information is browsed after the user browses the information. The interest object specifying period is an example of a first period according to the present invention.

Moreover, when the user has browsed a review list page, it is thought that the user is interested in the item which has been reviewed. Thus, the online mall server 1 may specify an item of which the item page is browsed within the interest object specifying period from the present moment as the interest object.

A link displayed as "See Reviews" is also displayed in the item page. When a user selects this link, a review list page of an item of which the information is displayed in the item page is displayed. Thus, when the user browses the item page and wants to view reviews on the item, the user can display the review list page. Thus, the online mall server 1 may specify only an item of which both the item page and the review list page are browsed as an interest object. This is because the user is more likely to be interested in an item of which the item page and the review list page are browsed than an item of which only the item page is browsed.

When the interest object is specified, the online mall server 1 selects an item related to the interest object among items registered in the bookmark. An item related to the interest object is referred to a "related item". The related item is an item that the user is likely to want to obtain information thereof. For example, when the interest object is an item, the related item may be an item of which the manufacturer is the same as that of the interest object, an item of which the genre is the same as that of the interest object, and an item of which the seller's shop is the same as that of the interest object. Moreover, for example, the related item may be an option item of which the main item is the interest object and a main item of which the option item is the interest object. For example, the option item may be consumables such as a replacement brush when a main item is an electric toothbrush and an accessory such as a case that stores a mobile PC when a main item is a mobile PC.

The reason why the related item is regarded as an item that the user is likely to want to obtain information thereof is that an item related to the interest object is also an item that the user is likely to be interested in. Specifically, this is because the related item is an object that is compared with the interest object when the user considers purchase or is an object that the user may consider purchasing together with the interest object, for example. Thus, since the user is interested in the related item, the user wants to obtain information on the related item.

The online mall server 1 displays the bookmark page to the user terminal 3 so that the bookmark item display region 100 of the related item of the interest object is displayed in such a display manner that the region is more easily visible than a display manner of the bookmark item display region 100 of an item that is not the related item of the interest object. In this way, the user can easily find an item that the user is likely to want to obtain information thereof.

The item itself specified as the interest object is not a related item of the interest object. It is optional whether the bookmark item display region 100 of the interest object is displayed in such a display manner that the region is easily visible.

In the present embodiment, the display rank of the related item of the interest object is higher than the display rank of an item that is not the related item of the interest object. On the other hand, the online mall server 1 sets the display ranks of related items such that the earlier the bookmark registration date and time, the higher the display rank. This is because the earlier the registration date and time of an item, the more the user is likely to forget having registered the item in the bookmark and to forget the information of the item. By displaying the bookmark item display region 100 of an item of which the bookmark registration date and time is early in such a display manner that the region is easily visible, the user can remember the item registered in the bookmark. Since the user is highly likely to remember an item of which the bookmark registration date and time is late, even if the item is displayed in such a display manner that the item is less easily visible than an item of which the bookmark registration data and time is early, the user may have no problem in finding the item.

Next, a specific example will be described. FIG. 3 is a list table illustrating examples of items registered in the bookmark of a certain user. FIG. 4 is a diagram illustrating a screen display example of a bookmark page. As illustrated in FIG. 3, items A-3, C-3, C-2, B-3, A-2, C-1, B-2, A-1, and B-1 are registered in a bookmark in descending order of registration date and time. Thus, when no interest object is specified, the first page of the bookmark page is displayed as illustrated in FIG. 2. The genre of the items A-1, A-2, and A-3 is food. Moreover, the genre of the items B-1, B-2, and B-3 is stationery. Further, the genre of the items C-1, C-2, and C-3 is books.

It is assumed that a user has browsed the item page of the item B-4, for example, by operating the user terminal 3. The genre of the item B-4 is stationery. It is assumed that after browsing the item page, the user has performed an operation of displaying a bookmark page before elapse of an interest object specifying period. In this case, the item B-4 is specified as an interest object. Moreover, the genre of the items B-1, B-2, and B-3 is the same as that of the item B-4. Thus, the items B-1, B-2, and B-3 are selected as the related items of the item B-4. Therefore, as illustrated in FIG. 4, the bookmark item display regions 100 are displayed in the order of the items B-1, B-2, B-3, A-3, and C-3. Since the bookmark item display regions 100 of the related items are displayed together, the user can easily compare the related items. In order to allow the user to easily understand whether items are related items or not, the space between the bookmark item display region 100 of the related item and the bookmark item display region 100 of a non-related item may be wider than the other space.

[1-3. Configuration of Online Mall Server]

Next, the configuration of the online mall server 1 will be described with reference to FIG. 5 and FIGS. 6A to 6G.

Figure 5:
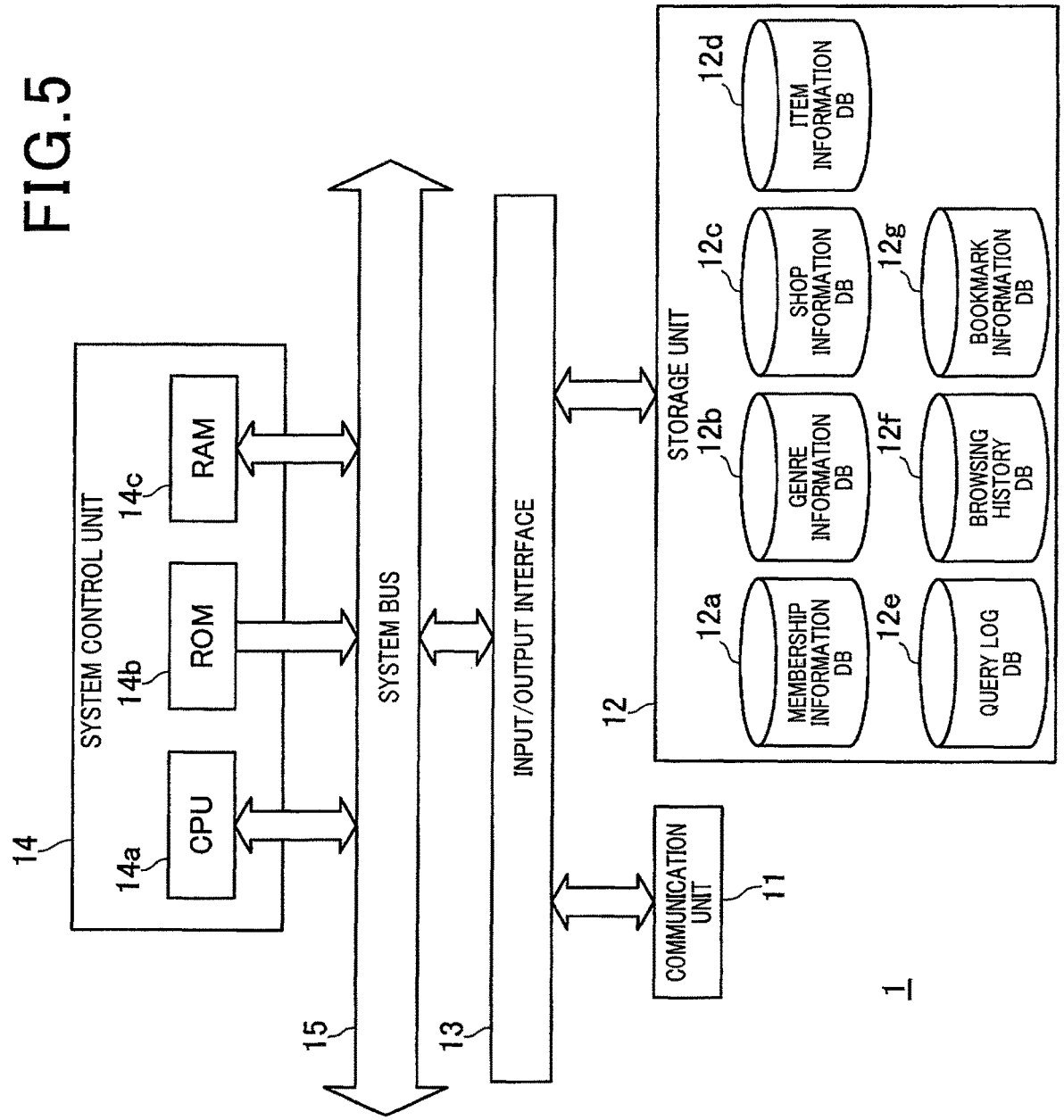
FIG. 5 is a block diagram illustrating an example of a schematic configuration of an online mall server 1 according to an embodiment.

FIG. 5 is a block diagram illustrating an example of a schematic configuration of the online mall server 1 according to the present embodiment. As illustrated in FIG. 5, the online mall server 1 includes a communication unit 11, a storage unit 12, an input/output interface 13, and a system control unit 14. The system control unit 14 and the input/output interface 13 are connected by a system bus 15.

The communication unit 11 is configured to connect to the network NW to control the communication state with the shop terminal 2, the user terminal 3, and the like.

The storage unit 12 is configured as, for example, a hard disk drive or the like. The storage unit 12 is an example of a history storing means and a reference list information storing means of the present invention. Databases such as a membership information DB 12a, a genre information DB 12b, a shop information DB 12c, an item information DB 12d, a query log DB 12e, a browsing history DB 12f, and a bookmark information DB 12g are constructed in the storage unit 12. "DB" is an abbreviation of a database.

FIG. 6A is a diagram illustrating an example of contents registered in the membership information DB 12a. Membership information of users registered in the information providing system. S as members is registered in the membership information DB 12a. Specifically, attributes of a user such as a user ID, a password, a nickname, a name, a date of birth, a gender, a zip code, an address, a telephone number, an email address, a holding point amount are registered in the membership information DB 12a in association with each user. The user ID is identification information of a user. The holding point amount is the amount of points held by the user. Points have the same value as a cash when a user purchases an item in an online mall and can be spent for a payment. Moreover, when a user purchases an item in an online mall, a point corresponding to the purchase price is granted to the user.

FIG. 6B is a diagram illustrating an example of contents registered in the genre information DB 12b. Genre information on the genre of an item is registered in the genre information DB 12b. Specifically, attributes of a genre such as a genre ID, a genre name, a genre level, a parent genre ID, and a child genre ID list are registered in the genre information DB 12b in association with each genre. The genre information is set by, for example, an administrator or the like of an online mall.

Genres of items are defined hierarchically by a tree structure. Specifically, each node of a tree structure corresponds to a genre. The depth of a node corresponds to the level (class) of the genre corresponding to the node. The depth of a node is a distance from a node (hereinafter referred to as a "root node") positioned at the root. The larger the level value, the deeper the level depth, and the smaller the level value, the shallower the level depth. A genre corresponding to a child node of the root node is a genre of level 1. The genre of level 1 is the highest genre. A genre corresponding to a child node among the genres of level 1 is defined as a genre of level 2. Here, a genre C2 corresponding to a child node of a certain genre C1 is referred to as a "child genre" of the genre C1. A child genre is also referred to as a sub-genre. Moreover, the genre C1 is referred to a "parent genre" of the genre C2. The child genre is a range to which the same items belong when the parent genre is further classified into a plurality of genres. Thus, the child genre belongs to a parent genre.

The genre ID is identification information of a genre defined by genre information. A parent genre ID is a genre ID of a parent genre of a genre defined by genre information. A child genre ID list is a list of genre IDs of child genres of a genre defined by genre information. The child genre ID list is set when a genre defined by genre information has a child genre.

FIG. 6C is a diagram illustrating an example of contents registered in the shop information DB 12c. Shop information on a shop that is open at an online mall is registered in the shop information DB 12c. Specifically, attributes of a shop such as a shop ID, a shop name, a zip code, an address, a telephone number, and an email address are registered in the shop information DB 12c in association with each shop. The shop ID is identification information of a shop.

FIG. 6D is a diagram illustrating an example of contents registered in the item information DB 12d. Item information on items sold in an online mall is registered in the item information DB 12d. Specifically, attributes of an item such as an item. ID, a shop ID, an item code, a genre ID, an item name, a uniform resource locator (URL) of an item image, an item description, and an item price are registered in the item information DB 12*d* in association with each item sold by the shop.

The item ID is identification information of an item for allowing a shop or the like to manage items sold. The shop ID indicates a seller's shop of an item. The item code is a code number for identifying an item. The same item code is assigned to the same item. The item code is, for example, a Japanese article number code (JAN) code. The item ID basically corresponds to an item page in one-to-one correspondence. Thus, different item IDs are assigned to a plurality of items of which the item codes are the same but which has different pieces of item information. In the present embodiment, items having different item IDs are regarded as different items. Thus, there is a possibility that an item having the same item code as an item specified as an interest object and having a different item ID from the interest object item is selected as a related item of the item specified as the interest object. The genre ID is an ID of a genre to which an item belongs. Basically, a genre ID of a genre (corresponding to a leaf node of a tree structure) that is defined in the lowest level is set. That is, items are classified into finest genres. The item name is the name of an item assigned by a shop. Thus, this item name is sometimes different from an official name of the item.

FIG. 6E is a diagram illustrating an example of contents registered in the query log DB 12*e*. Query logs are registered in the query log DB 12*e*. A query log is the history of the user designating a search condition. Specifically, reception date and time, search condition information, and a user ID are registered in the query log DB 12*e* in association whenever a search request is received. The query log is an example of a history according to the present invention. The search request is a message transmitted from the user terminal 3 to the online mall server 1 when a user designates a search condition and performs an operation of requesting retrieval of items. The search request includes search condition information.

The reception date and time is the date and time when a search request is received. The search condition information is information indicating the search condition designated by the user. When a keyword is designated as the search condition, the search condition information includes the designated keyword. When a genre is designated as the search condition, the search condition information includes a genre ID of the designated genre. When a plurality of search conditions is designated, the search condition information includes a plurality of pieces of information indicating the search conditions. The user ID indicates the user who has requested retrieval.

FIG. 6F is a diagram illustrating an example of contents registered in the browsing history DB 12*f*. A browsing history of a web page of an online mall is registered in the browsing history DB 12*f*. Specifically, a browsing date and time, a URL, a user ID, and a browsing period are registered in the browsing history DB 12*f* in association whenever a web page is browsed. The browsing history is an example of a history according to the present invention.

The browsing date and time indicates the date and time when an item page was browsed. Specifically, the browsing date and time is the date and time when the online mall server 1 transmitted a web page to the user terminal 3. The URL is a URL of a web page browsed. The URL of a web page of an online mall is information that can specify the type of a web page. Examples of the type of a web page include a top page, a retrieval result page, an item page, a review list page, a shop page, and a bookmark page. Moreover, the URL of an item page and a review list page includes an item ID of the corresponding item. Moreover, the URL of a shop page includes a shop ID of the corresponding shop. Thus, it is possible to specify the type of a web page and an item and a shop on which information the web page includes from the URL. The user ID indicates the user who browsed the web page.

The browsing period indicates the length of a period in which the web page was browsed. Specifically, the browsing period is the length of a period in which a web page is displayed on the screen of the user terminal 3. An example of a method of calculating the browsing period will be described. When a web page is transmitted to a certain user terminal 3, the system control unit 14 registers the date and time of transmission as a browsing date and time, a URL of the transmitted web page, the user ID of a user using the destination user terminal 3 in association as a browsing history. After that, when another web page request is received from the user terminal 3, the system control unit 14 acquires the URL of a web page displayed on the user terminal 3 from a Referrer header of the request. The system control unit 14 retrieves a browsing history that includes the user ID of the user using the user terminal 3 and the acquired URL. Subsequently, the system control unit 14 calculates the browsing period by subtracting the browsing date and time included in the retrieved browsing history from the present date and time. Then, the system control unit 14 adds the retrieved browsing history to the browsing period.

FIG. 6G is a diagram illustrating an example of contents registered in the bookmark information DB 12*g*. Bookmark information on the bookmark of a user is registered in the bookmark information DB 12*g*. The bookmark information is an example of reference list information according to the present invention. Specifically, a user ID, an item ID, and a registration date and time are registered in the bookmark information DB 12*g* in association whenever an item is registered in a bookmark.

The user ID indicates a user who has registered an item in a bookmark. The item ID indicates an item registered in a bookmark. Moreover, the item ID is information corresponding to a reference to an item page of the item registered in the bookmark. Although the actual information of a reference to the item page is a URL, the URL of the item page can be specified from the item ID. The URL of the item page may be registered in the bookmark information DB 12*g* together with the item ID or in place of the item ID. The registration date and time indicates the date and time when an item was registered in the bookmark. The registration date and time is an example of a registration time according to the present invention.

Next, the other pieces of information stored in the storage unit 12 will be described. Various types of data such as a hypertext markup language (HTML) document, an extensible markup language (XML) document, image data, text data, and an electronic document for displaying a web page are stored in the storage unit 12. Moreover, various setting values set by an administrator or the like are stored in the storage unit 12. Examples of the setting values include an interest object specifying period.

Moreover, various programs such as an operating system, a world wide web (WWW) server program, a database management system (DBMS), and an electronic commerce management program are stored in the storage unit 12. The electronic commerce management program is a program for performing various processes associated with electronic commerce. The electronic commerce management program includes a program for specifying an interest object, selecting a related item, and determining the display manner of the bookmark item display region 100 of the bookmark page. The programs may be acquired from another server apparatus through the network NW or may be recorded in a recording medium such as a digital versatile disc (DVD) and read by a drive device.

The input/output interface 13 is configured to perform interfacing processes between the communication unit 11 and the storage unit 12, and the system control unit 14.

The system control unit 14 is configured to include a CPU 14*a*, a read only memory (ROM) 14*b*, a random access memory (RAM) 14*c*, and the like. The system control unit 14 is configured to function as a specifying means, a selecting means, and a controlling means according to the present invention when the CPU 14*a* reads and executes various programs.

The online mall server 1 may be configured as a plurality of server apparatuses. For example, a server apparatus that performs processes associated with a bookmark, a server apparatus that performs processes associated with retrieving, ordering, and the like of items, a server apparatus that transmits a web page in response to a request from the user terminal 3, a server apparatus that manages databases, and the like may be connected to each other by a LAN or the like.

[1-4. Operation of Information Providing System]

Next, the operation of the information providing system S will be described with reference to FIGS. 7 to 10. The operation will be described with reference to Application Examples 1 to 3 depending on a difference between an interest object specifying method and a related item selecting method. In Application Examples 1 to 3, items having the same genre as the interest object are used as related items. Moreover, the lowest level of genre is level 5. Two or more application examples of Application Examples 1 to 3 may be combined.

1-4-1. Application Example 1

In Application Example 1, an item of which at least one of the item page and the review list page is browsed within the interest object specifying period from the present moment is specified as an interest object, and the display ranks of the bookmark item display regions 100 of items related to the interest object are on the higher ranks. That is, the bookmark page is displayed in the display manner described with reference to FIGS. 3 and 4.

Figure 7:
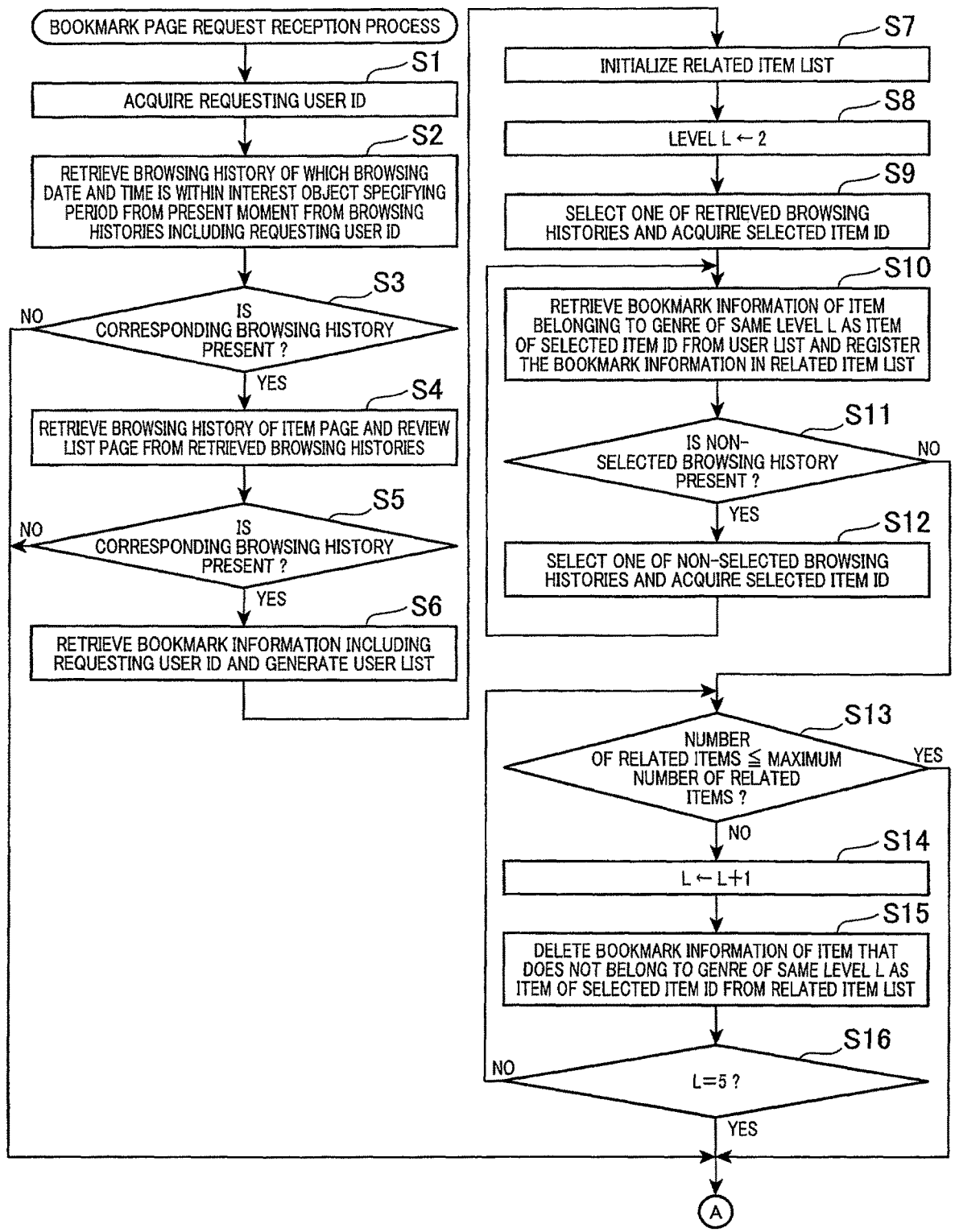
FIG. 7 is a flowchart illustrating a processing example of a bookmark page request reception process in one application example of a system control unit 14 of the online mall server 1 according to an embodiment.
Figure 8:
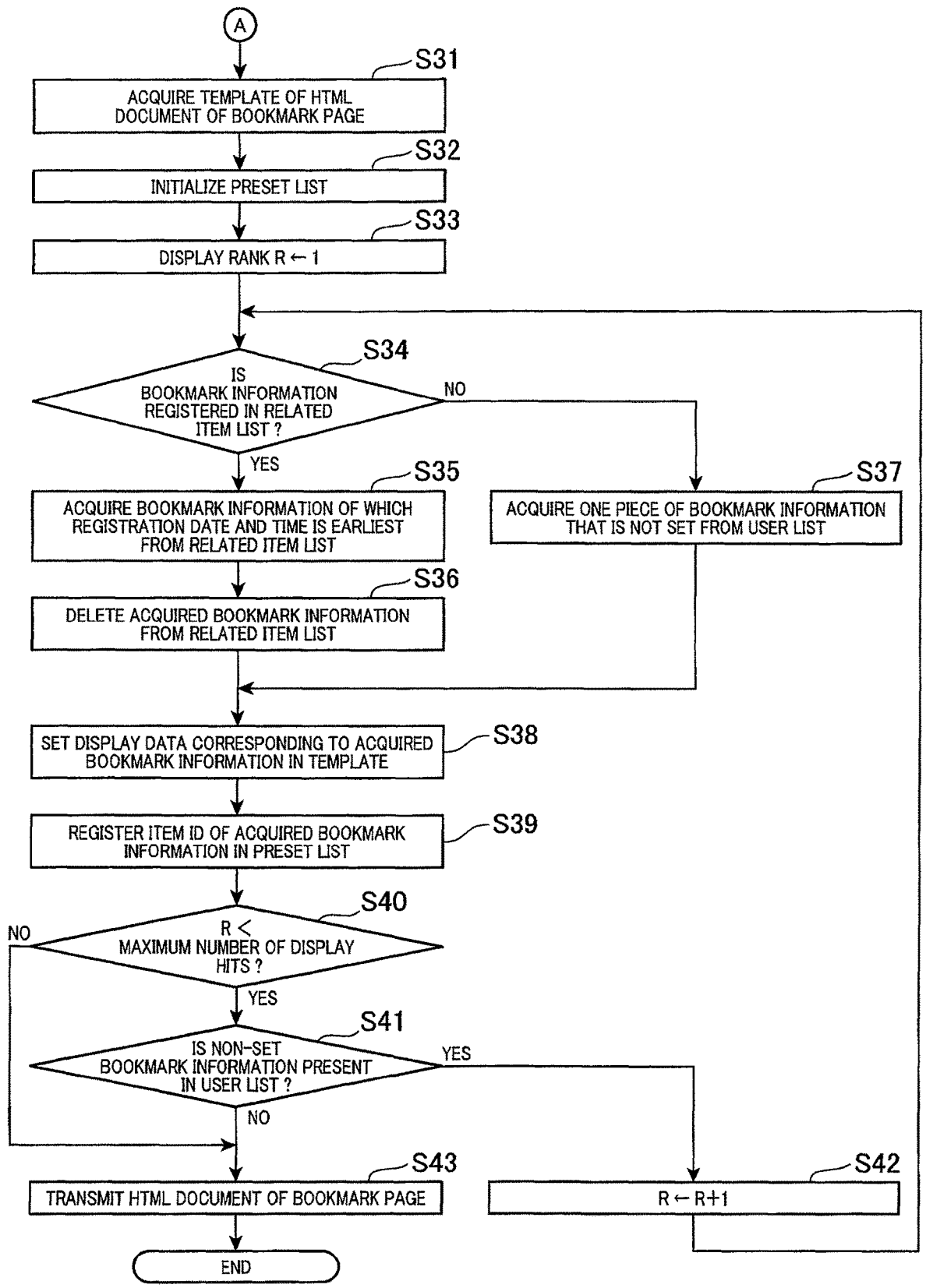
FIG. 8 is a flowchart illustrating a processing example of a bookmark page request reception process in one application example of a system control unit 14 of the online mall server 1 according to an embodiment.

FIGS. 7 and 8 are flowcharts illustrating a processing example of a bookmark page request reception process according to Application Example 1 of the system control unit 14 of the online mall server 1 according to the present embodiment. The bookmark page request reception process starts when the online mall server 1 receives a bookmark page request from the user terminal 3.

As illustrated in FIG. 7, the system control unit 14 acquires the user ID of a user using the user terminal 3 that has transmitted a request from the received request as a requesting user ID (step S1). For example, when a user logs in the information providing system S, the system control unit 14 receives the user ID from the user terminal 3 and stores the received user ID in the user terminal 3 as a cookie. Thus, when the user is logged in, the cookie including the requesting user ID is added to the request transmitted from the user terminal 3 to the online mall server 1.

Subsequently, the system control unit 14 retrieves a browsing history in which the browsing date and time is included within the interest object specifying period from the present moment among the browsing histories that include the requesting user ID as the user ID from the browsing history DB 12*f* (step S2). The browsing date and time included in the browsing history is the date and time when the web page starts being displayed. Thus, a browsing history in which the date and time when the web page starts being displayed on the screen is included within the interest object specifying period from the present moment is retrieved. However, it can be thought that a web page is browsed, for example, while the web page is displayed. That is, any point in time until a web page disappears from the screen after the web page starts being displayed can be regarded as the browsing date and time. Thus, for example, the system control unit 14 may retrieve the browsing history by regarding the date and time when a web page disappears from the screen as the browsing date and time of the web page. Moreover, for example, the system control unit 14 may retrieve the browsing history by regarding an intermediate date and time between the date and time when a web page starts being displayed and the date and time when the web page disappears from the screen. By adding the browsing period included in the browsing history to the browsing date and time included in the browsing history, the date and time when the web page stops being displayed can be calculated.

Subsequently, the system control unit 14 determines whether it was possible to retrieve the corresponding browsing history (step S3). When it is determined that it was not possible to retrieve the corresponding browsing history (step S3: NO), the system control unit 14 proceeds to step S31.

On the other hand, when it is determined that it was possible to retrieve the corresponding browsing history (step S3: YES), the system control unit 14 retrieves the browsing history of the item page and the browsing history of the item page from the retrieved browsing history (step S4). Subsequently, the system control unit 14 determines whether it was possible to retrieve the corresponding browsing history (step S5). In this case, when it is determined that it was not possible to retrieve the corresponding browsing history (step S5: NO), the system control unit 14 proceeds to step S31.

On the other hand, when it is determined that it was possible to retrieve the corresponding browsing history (step S5: YES), the system control unit 14 retrieves bookmark information including the requesting user ID as the user ID from the bookmark information DB 12*g* (step S6). Moreover, the system control unit 14 generates a list in which the retrieved bookmark information is registered as a user list. The system control unit 14 as a specifying means specifies the interest object of the user indicated by the requesting user ID based on the browsing history by performing the processes of steps S1 to S6. The user list is a list in which the browsing histories of items specified as the interest object are registered.

Subsequently, the system control unit 14 initializes a related item list (step S7). The related item list is a list in which bookmark information of related items is registered. Subsequently, the system control unit 14 sets the level L of a genre to "2" (step S8). An item belonging to the same genre as the interest object among the genres of level L becomes the related item.

Subsequently, the system control unit 14 selects one browsing history from the browsing histories retrieved in step S4. Moreover, the system control unit 14 acquires an item ID of the item specified as the interest object from the URL included in the selected browsing history as a selected item ID (step S9). Subsequently, the system control unit 14 retrieves bookmark information of an item belonging to the same genre of level L as the item indicated by the selected item ID from the user list (step S10). Specifically, the system control unit 14 retrieves item information including the item ID as the selected item ID from the item information DB 12d and acquires a genre ID from the retrieved item information. The genre ID set in the item information is a genre ID of a genre of the level 5. Thus, the system control unit 14 acquires a genre ID of the level L of the item indicated by the selected item ID from the genre information DB 12b. A parent genre ID is set in the genre information. Thus, the genre ID of level 4 which is a parent genre can be acquired from the genre information corresponding to the genre ID of level 5. The system control unit 14 repeats such a process until the genre ID of level 2 is acquired. Moreover, the system control unit 14 acquires an item ID of an item registered in the bookmark from the respective pieces of bookmark information registered in the user list. Subsequently, the system control unit 14 acquires a genre ID of level L of the item indicated by the acquired item ID. A method of acquiring the genre ID of level L of the item registered in the bookmark is the same as a method of acquiring the genre ID of the item indicated by the selected item ID. Subsequently, the system control unit 14 specifies an item of which the genre ID of level L is identical to the genre ID of level L of the item specified as the interest object among the items registered in the bookmark. Then, the system control unit 14 acquires the bookmark information of the specified item from the user list. In this way, the system control unit 14 retrieves the bookmark information of the item belonging to the same genre of level L as the item indicated by the selected item ID. The system control unit 14 registers the retrieved bookmark information in the related item list. The system control unit 14 does not register the bookmark information including the same item ID as the selected item ID in the related item list. That is, the system control unit 14 does not extract the interest object itself as the related item.

Subsequently, the system control unit 14 determines whether a browsing history that has not been selected is present in the browsing histories retrieved in step S5 (step S11). In this case, when it is determined that the browsing history that has not been selected is present (step S11: YES), the system control unit 14 selects one browsing history among the browsing histories that have not been selected. Moreover, the system control unit 14 acquires an item ID from the selected browsing history as the selected item ID (step S12). Subsequently, the system control unit 14 proceeds to step S10.

The system control unit 14 retrieves items belonging to the same genre of level L as each of the items specified as the interest object by repeating the processes of steps S10 to S12. A certain item may be a related item of each of a plurality of items specified as the interest object. Thus, when the bookmark information is registered in the related item list in step S10, the system control unit 14 prevents the bookmark information of the same items from being registered redundantly. That is, it is ensured that one bookmark information at most is registered in the related item list for each of the items registered in the bookmark.

In step S4, the system control unit 14 may retrieve only the browsing history of which the browsing date and time is the latest among the browsing histories of the item page, the review list page, and the like. That is, the system control unit 14 may specify only an item of which the information is browsed lastly as the interest object. For example, when a user browses the item page of the item B-1 after browsing the item page of the item A-1, it may be thought that the interest object of the user is changed from the item A-1 to the item B-1. In this case, the system control unit 14 performs step S10 only once and does not perform steps S11 and S12. Moreover, in this case, when the browsing history of which the browsing date and time is the latest among the browsing histories of which the browsing date and time is within the interest object specifying period from the present moment is not the browsing history of the item page or the review list page, the system control unit 14 may proceed to step S31 without performing the processes of steps S6 to S16. That is, only when a user performs an operation of displaying the bookmark page directly in a state where the item page or the review list page is displayed, an item corresponding to the item page or the review list page displayed at the present moment may be specified as the interest object. When the item page or the review list page is changed to another web page, it may be thought that the interest object of the user has changed to another object or has lost interest in the item.

Moreover, the system control unit 14 may determine whether the user has lost interest in the item that the user has browsed information thereof based on an item searching history of the user after browsing the item page or the review list page. For example, it is assumed that a user has searched for an item by designating a search condition related to the item A-1 after browsing the item page of the item A-1. In this case, since it is highly likely that items related to the item A-1 are retrieved, it is thought that the user is still interested in the item A-1. On the other hand, it is assumed that a user has searched for an item by designating a search condition that is not related to the item A-1. In this case, since it is less likely that items related to the item. A-1 are retrieved, it can be thought that the user's interest has moved to another item that is not related to the item A-1. For example, when the item name of the item A-1 includes a keyword designated by the user, it is thought that the designated keyword is related to the item A-1. Moreover, for example, when the item name or the item description of the item A-1 includes the item name or the item's model number designated by the user as a keyword, it is thought that the designated keyword is related to the item A-1. Further, when the item A-1 is an item belonging to the genre designated by the user, it is thought that the designated genre is related to the item A-1. In step S4, the system control unit 14 retrieves a query log of which the reception date and time of the search request is later than the browsing date and time of the retrieved browsing history among the query logs including the requesting user ID as the user ID from the query log DB 12e after retrieving the browsing history. Subsequently, the system control unit 14 acquires a query log of which the reception date and time is the latest among the retrieved query logs. Then, the system control unit 14 determines whether the search condition designated lastly by the user is related to the item of which the browsing history is retrieved based on the search condition information included in the acquired query log. The reason why only the search condition designated lastly is used is that it is thought that the search condition designated lastly is most related to the item that the user is interested in at the present moment. When it is determined that the search condition is related to the item, the system control unit 14 proceeds to step S5. On the other hand, when it is determined that the search condition is not related to the item, the system control unit 14 proceeds to step S31. The system control unit 14 may retrieve an item that satisfies the search condition indicated by the search condition information from the items of which the browsing histories are retrieved. Moreover, the system control unit 14 may determine that the item satisfying the search condition is an item related to the search condition. Further, when there are a number of search conditions designated lastly by the user, the system control unit 14 may proceed to step S5 when at least one search condition is related to the item and may proceed to step S5 when all search conditions are related to the item.

When it is determined in step S11 that all browsing histories have been selected (step S11: NO), the system control unit 14 adjusts the range of items related to the interest object so that the number of related items selected finally as the related items is a predetermined maximum number of related items or smaller. The reason why the range is adjusted is to prevent the number of items selected finally as the related items from becoming too large. If the number of related items is too large, it may become troublesome for the user to check all related items from the bookmark page. The maximum number of related items is set by an administrator or the like of an online mall, for example, and is stored in the storage unit 12. The maximum number of related items may be the same as the maximum number of display hits. In this way, the user can check information on all related items in the bookmark page displayed first. Moreover, the maximum number of related items may be larger or smaller than the maximum number of display hits.

First, the system control unit 14 counts the number of pieces of bookmark information registered in the related item list as the number of related items. Moreover, the system control unit 14 determines whether the number of related items is equal to or smaller than the maximum number of related items (step S13). In this case, when it is determined that the number of related items is not equal to or smaller than the maximum number of related items (step S13: NO), the system control unit 14 adds "1" to level L (step S14). Subsequently, the system control unit 14 deletes the bookmark information of an item that does not belong to the same genre of level L as the item specified as the interest object from the related item list (step S15). Specifically, the system control unit 14 acquires the genre ID of level L of the item specified as the interest object and the genre ID of level L of the item of which the bookmark information is registered in the related item list in the same manner as step S10. Subsequently, the system control unit 14 specifies an item of which the genre ID of level L is different from the genre ID of level L of the item specified as the interest object. When there are a number of items specified as the interest object, the system control unit 14 specifies an item of which the genre ID of level L is different from all genre IDs of level L of the respective items specified as the interest object. Moreover, the system control unit 14 deletes the bookmark information of the specified item from the related item list. In this way, the system control unit 14 narrows down the range of items related to the interest object. The narrower the range of items related to the interest object, the higher the relevance between the interest object and the item selected as the related item.

Subsequently, the system control unit 14 determines whether level L is "5" (step S16). In this case, when it is determined that level L is not "5" (step S16: NO), the system control unit 14 proceeds to step S13. Moreover, when it is determined that the number of related items is equal to or smaller than the maximum number of related items (step S13: YES), or when it is determined that level L is "5" (step S16: YES), the system control unit 14 proceeds to step S31. The system control unit 14 as a selecting means selects an item related to the interest object from the items registered in the bookmark by performing the processes of steps S7 to S16. Although the initial value of level L set in step S8 is "2," level L may have another initial value other than 2. Moreover, the system control unit 14 may not perform the processes of steps S13 to S16. That is, the system control unit 14 may select all items belonging to the same genre as the item specified as the interest object as the related item at the level set in step S8.

In step S31 illustrated in FIG. 8, the system control unit 14 acquires a template of the HTML document of the bookmark page from the storage unit 12 (step S31). Subsequently, the system control unit 14 initializes a preset list (step S32). The preset list is a list in which the item IDs of items of which the display data of the bookmark item display region 100 is set in the template of the HTML document of the bookmark page among the items registered in the bookmark are registered. Subsequently, the system control unit 14 sets the display rank R to "1" (step S33).

Subsequently, the system control unit 14 determines whether at least one piece of bookmark information is registered in the related item list (step S34). In this case, when it is determined that at least one piece of bookmark information is registered in the related item list (step S34: YES), the system control unit 14 acquires one piece of bookmark information of which the registration date and time is the earliest among the pieces of bookmark information registered in the related item list (step S35). Subsequently, the system control unit 14 deletes the acquired bookmark information from the related item list (step S36). On the other hand, when it is determined that no bookmark information is registered in the related item list (step S34: NO), the system control unit 14 acquires one piece of bookmark information of an item of which the item ID is not registered in the preset list from the pieces of bookmark information registered in the user list (step S37). In this case, the system control unit 14 acquires one piece of bookmark information of which the registration date and time is the latest.

When the process of step S36 or S37 ends, the system control unit 14 sets the display data of the bookmark item display region 100 corresponding to the acquired bookmark information to the acquired template (step S38). Specifically, the system control unit 14 acquires item information corresponding to the item ID included in the acquired bookmark information from the item information DB 12*d*. Subsequently, the system control unit 14 acquires an item name, a shop ID, an item price, a URL of an item image, and the like from the acquired item information. Moreover, the system control unit 14 generates the URL of the item page or the URL of the shop page based on the item ID or the shop ID. Subsequently, the system control unit 14 generates data including an item name, an item price, a bookmark registration date and time, a URL, and the like. Moreover, the system control unit 14 sets the generated data to the template. When the display data of the bookmark item display region 100 is set, the system control unit 14 registers the item ID included in the bookmark information in the preset list (step S39).

Subsequently, the system control unit 14 determines whether the display rank R is smaller than the maximum number of display hits (step S40). In this case, when it is determined that the display rank R is smaller than the maximum number of display hits (step S40: YES), the system control unit 14 determines whether bookmark information of an item of which the item ID is not registered in the preset list is present in the pieces of bookmark information registered in the user list (step S41). In this case, when it is determined that the bookmark information of an item of which the item ID is not registered in the preset list is present (step S41: YES), the system control unit 14 adds "1" to the display rank R (step S42). Subsequently, the system control unit 14 proceeds to step S34.

The system control unit 14 sets the display data of the bookmark item display region 100 until a number of pieces of display data of the bookmark item display region 100 corresponding to the maximum number of display hits are set or the display data of the bookmark item display region 100 is set for all bookmark items by repeating the processes of steps S34 to S42. When one or more related items are selected, the display data of the bookmark item display region 100 is set in descending order of bookmark registration date and time of related items. After data is set for all related items, the display data of the bookmark item display region 100 is set in descending order of bookmark registration date and time of items among the non-related items. The system control unit 14 sets the display data of the bookmark item display regions 100 so that the bookmark item display region 100 of which the data is set later is displayed on the lower rank than the bookmark item display region 100 of which the data is set earlier.

When it is determined that the display rank R is not smaller than the maximum number of display hits (step S40: NO), or when it is determined that the bookmark information of an item of which the item ID is not registered in the preset list is not present (step S41: NO), the system control unit 14 transmits the completed HTML document of the bookmark page in which the data is set to the user terminal 3 that transmitted the request (step S43). When this process ends, the system control unit 14 ends the bookmark page request reception process.

The user terminal 3 having received the HTML document of the bookmark page displays the bookmark page on the screen based on the received HTML document. In this case, the system control unit 14 displays the bookmark item display regions 100 in the order of the display data set in the bookmark item display regions 100. In this way, the system control unit 14 as a controlling means displays a bookmark list on the user terminal 3 so that the bookmark item display region 100 of the related item of the interest object is displayed in such a display manner that the region is more easily visible than a display manner of the bookmark item display region 100 of an item that is not the related item of the interest object. Moreover, the system control unit 14 displays the bookmark item display regions 100 of the related items of the interest object on the user terminal 3 in ascending order of the bookmark registration date and time.

1-4-2. Application Example 2

In Application Example 2, an item of which the browsing period of an item page or a review list page is shorter than a predetermined shortest browsing period among items of which at least one of the item page and the review list page has been browsed within the interest object specifying period from the present moment is excluded from the interest object. This is because it is thought that an item of which the browsing period is short is an item that the user was not interested in. For example, when a user selects an item from the retrieval result page by mistake, although the item page is displayed, the user may immediately perform an operation to return to display the retrieval result page. Moreover, for example, when a user has displayed an item page, and in a relatively short period, understands from information displayed in the item page that the item page is not related to an item that the user is interested in, the user may immediately perform an operation to return to display the retrieval result page. The shortest browsing period is set by, for example, an administrator or the like of an online mall, and is stored in the storage unit 12. For example, the shortest browsing period may be set to be equal to or shorter than the interest object specifying period. For example, the interest object specifying period may be one hour and the shortest browsing period may be five seconds. The shortest browsing period is an example of a second period according to the present invention.

A specific example will be described. It is assumed that a user has browsed the item page of the item A-4 for two minutes in a state where items are registered in the bookmark as illustrated in FIG. 3. The genre of the item A-4 is foods. After that, the user browses the item page of the item B-4 for three seconds. It is assumed that the shortest browsing period is five seconds. Moreover, it is assumed that a bookmark page is displayed within the interest object specifying period from the browsing date and time of the item page of the item A-4. In the case of Application Example 1, items A-4 and B-4 are specified as the interest object. Alternatively, for example, the item B-4 only is specified as the interest object. On the other hand, in Application Example 2, the item A-4 only is specified as the interest object. Thus, the bookmark item display regions 100 are displayed in the bookmark page in the order of the items A-1, A-2, A-3, C-3, and C-2.

Figure 9:
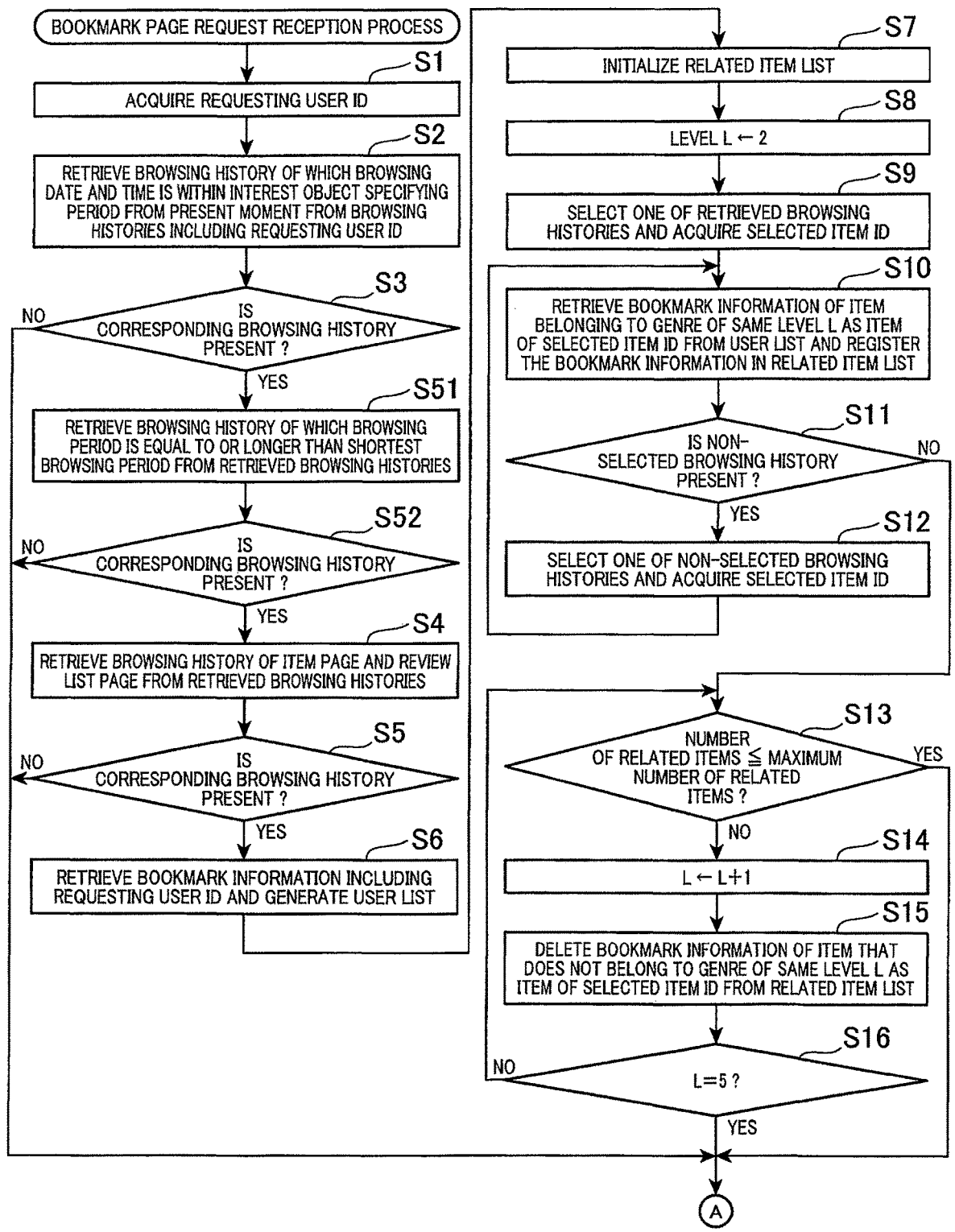
FIG. 9 is a flowchart illustrating a processing example of a bookmark page request reception process in one application example of a system control unit 14 of the online mall server 1 according to an embodiment.

FIG. 9 is a flowchart illustrating a processing example of a bookmark page request reception process according to Application Example 2 of the system control unit 14 of the online mall server 1 according to the present embodiment. In FIG. 9, the same reference numerals are assigned to the same processes as FIG. 7. The processes of steps S31 to S43 are the same as the processes illustrated in FIG. 8.

As illustrated in FIG. 9, the system control unit 14 performs steps S1 to S3 similarly to Application Example 1. When it is determined in step S3 that it was possible to retrieve the corresponding browsing history (step S3: YES), the system control unit 14 retrieves a browsing history of which the browsing period is equal to or longer than the shortest browsing period among the retrieved browsing histories (step S51). Subsequently, the system control unit 14 determines whether it was possible to retrieve the corresponding browsing history (step S52). In this case, when it is determined that it was not possible to retrieve the corresponding browsing history (step S52: NO), the system control unit 14 proceeds to step S31.

On the other hand, when it is determined that it was not possible to retrieve the corresponding browsing history (step S52: YES), the system control unit 14 retrieves the browsing history of the item page and the browsing history of the review list page from the browsing histories retrieved in step S51 (step S4). After that, the system control unit 14 performs steps S5 to S16 and S31 to S43 similarly to Application Example 1.

1-4-3. Application Example 3

In Application Example 3, only the bookmark item display region 100 of an item that is more advantageous to the user in terms of transaction than the item specified as the interest object is displayed in such a display manner that the region is easily visible. A user may consider purchasing an item by comparing an interest object item of which the information is browsed in the item page or the like with an item registered in the bookmark. When a user selects an item to be purchased among a plurality of items, it is thought that the user may select an item that is advantageous to the user in terms of transaction as much as possible. Thus, it is highly likely that the user wants to obtain information on an item that is more advantageous to the user than an item specified as the interest object more than an item that is disadvantageous to the user.

Whether an item is advantageous to the user in terms of transaction is determined based on an attribute of an item. An example of an attribute used for determining whether an item is advantageous is an item price. The lower the price of an item, the more advantageous to the user. The attribute used for determining whether an item is advantageous is not limited to the item price. Examples of the attribute used for determining whether an item is advantageous include a delivery method of an item, a delivery fee of an item, a point reward percentage, the number of items in stock, an evaluation score of an item, and the like. These pieces of information may be included in the item information. A delivery method in which it is guaranteed that an item is delivered on the next day of the date of order is more advantageous to the user than a delivery method in which it is not guaranteed that an item is delivered on the next day of the date of order. Moreover, the lower the delivery fee, the more advantageous to the user. The point grant percentage is the percentage of points rewarded to the user who has purchased an item with respect to the price of the item. The higher the point reward percentage, the more advantageous to the user. The larger the number of items in stock, the more advantageous to the user. The higher the evaluation score, the more advantageous to the user. A total purchase cost obtained by summing the item price and the delivery fee is also an example of the attribute that can be used for determining whether an item is advantageous to the user. The lower the total purchase cost, the more advantageous to the user.

A specific example will be described. It is assumed that a user has browsed the item page of the item C-4 in a state where items are registered in the bookmark as illustrated in FIG. 3. The genre of the item C-4 is books. Moreover, the price of the item C-4 is 1,500 yen. The prices of the items C-1, C-2, and C-3 are 1,000 yen, 1,300 yen, and 1,600 yen, respectively. It is assumed that the user performed an operation of displaying a bookmark page within the interest object specifying period after browsing the item page. Then, the item C-4 is specified as the interest object. The genres of the items C-1, C-2, and C-3 are the same as the item C-4. The prices of the items C-1 and C-2 only among the items C-1, C-2, and C-3 are lower than the item C-4. Thus, the items C-1 and C-2 are selected as the related items. Therefore, the bookmark item display regions 100 are displayed in the bookmark page in the order of the items C-1, C-2, A-3, C-3, and B-3.

Figure 10:
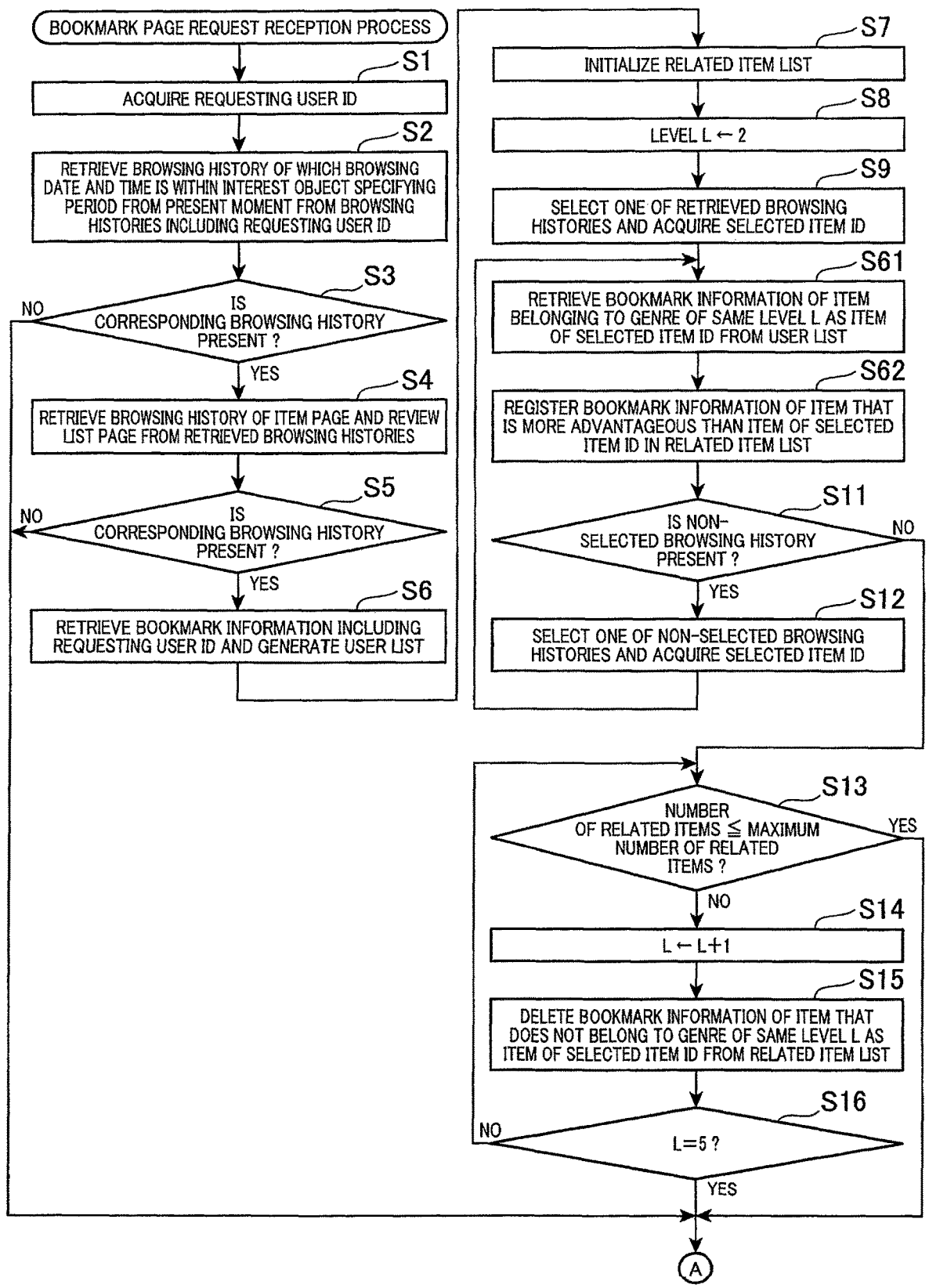
FIG. 10 is a flowchart illustrating a processing example of a bookmark page request reception process in one application example of a system control unit 14 of the online mall server 1 according to an embodiment.

FIG. 10 is a flowchart illustrating a processing example of a bookmark page request reception process according to Application Example 3 of the system control unit 14 of the online mall server 1 according to the present embodiment. In FIG. 10, the same reference numerals are assigned to the same processes as FIG. 7. The processes of steps S31 to S43 are the same as the processes illustrated in FIG. 8.

As illustrated in FIG. 10, the system control unit 14 performs steps S1 to S9 similarly to Application Example 1. Subsequently, the system control unit 14 retrieves bookmark information of an item belonging to the same genre of level L as the item indicated by the selected item. ID from the user list (step S61). The detailed process of this step is basically the same as that of step S10 of Application Example 1. However, at this point in time, the bookmark information is not registered in the related item list.

Subsequently, the system control unit 14 extracts bookmark information of an item which is more advantageous to the user than the item indicated by the selected item ID among the pieces of retrieved bookmark information and registers the extracted bookmark information in the related item list (step S62). Specifically, the system control unit 14 acquires an item price from the item information of the item indicated by the selected item ID. Moreover, the system control unit 14 acquires an item price from the item information corresponding to the item ID included in the retrieved bookmark information. Subsequently, the system control unit 14 compares the item price of the item indicated by the selected item ID with the item price acquired for the retrieved bookmark information. Then, the system control unit 14 registers the bookmark information of an item of which the item price is lower than that of the item indicated by the selected item ID in the related item list. After that, the system control unit 14 performs steps S11 to S16 and S31 to S43 similarly to Application Example 1.

In the respective application examples, the conditions of the related item are such that the related item has the same genre as the interest object. In the following description, a case where different conditions of the related item are used will be described.

When the conditions of the related item are such that the related item is manufactured by the same manufacturer as the interest object, for example, information indicating the manufacturer of an item is included in the item information. Alternatively, a catalog DB in which information on items is registered for respective item codes may be constructed in the storage unit 12. Moreover, information indicating the manufacturer of an item may be included in the item information for respective item codes. After performing the process of step S9 illustrated in FIG. 7, for example, the system control unit 14 retrieves bookmark information of an item of which the manufacturer is the same as the item specified as the interest object from the user list and registers the bookmark information in the related item list. Then, the system control unit 14 proceeds to step S11. Moreover, when it is determined that all browsing histories have been selected (step S11: NO), the system control unit 14 proceeds to step S31 without performing the processes of steps S13 to S16.

When the conditions of the related item are such that the seller's shop of the related item is the same as the interest object, the system control unit 14 retrieves bookmark information of an item of which the seller's shop is the same as the item specified as the interest object from the user list after performing the process of step S9. In this case, the system control unit 14 does not perform the processes of steps S13 to S16.

For example, when the conditions of the related item are such that the relation between the related item and the interest object is a relation of a main item and an option item, a related item DB in which an item code of a main item and an item code of an option item are registered in association in the storage unit 12. After performing the process of step S9, the system control unit 14 retrieves bookmark information of an item which is a main item of the item specified as the interest object and bookmark information of an item which is an option item of the item specified as the interest object from the user list based on the related item DB. In this case, the system control unit 14 does not perform the processes of steps S13 to S16.

Moreover, the system control unit 14 may select the related items by combining two or more of the plurality of conditions described above. Here, when the combined conditions include conditions that the related item has the same genre as the interest object, the system control unit 14 may perform the processes of steps S13 to S16.

As described above, according to the present embodiment, the system control unit 14 of the online mall server 1 specifies an item that a user is interested in as an interest object based on a browsing history stored in the storage unit 12, selects an item related to the item specified as the interest object among items registered in the bookmark, and displays a bookmark list so that the bookmark item display region 100 of the selected item is displayed in such a display manner that the region is easier to be visible than a display manner of the bookmark item display region 100 of an item that is not selected. Due to this, it is possible to allow the user to find an item that the user is likely to want to obtain information thereof among the items registered in the bookmark easily. By doing so, it is possible to reduce the number of requests from the user terminal 3 that the user issues to find an item from the bookmark page.

Moreover, the system control unit 14 may specify an item of which the item page is browsed within the interest object specifying period from the present moment as the interest object. Due to this, it is possible to specify an item that the user is likely to be interested in.

Moreover, the system control unit 14 may exclude an item of which the length of a display period of the item page is shorter than the shortest browsing period from the interest object. By doing so, since information on an item of which the item page has been browsed recently and which is related to an item that the user is less likely to be interested in is not displayed in such a display manner that the item is easily visible, the user can find an item that the user is likely to want to obtain information thereof more easily.

Further, the system control unit 14 may display the bookmark in such a display manner that a display rank of the bookmark item display region 100 of the item selected as the related item is higher than a display rank of the bookmark item display region 100 of an item that is not selected as the related item. By doing so, even when the number of items which are registered in the bookmark and of which the bookmark item display regions 100 can be displayed simultaneously is limited, it is possible to allow the user to find an item that the user wants to obtain information thereof more easily.

Further, the system control unit 14 may display the bookmark item display regions 100 of the selected items in ascending order of registration date and time included in the bookmark information stored in the storage unit 12. By doing so, it is possible to allow the user to remember that the item that the user wants to obtain information thereof is registered in the bookmark more easily.

Further, the system control unit 14 may select an item that is more advantageous to the user in terms of transaction than the item specified as the interest object among items related to the item specified as the interest object. By doing so, since the bookmark item display region 100 of an item which is related to the item that the user is interested in and which is related to an item that the user is less likely to be interested in is not displayed in such a display manner that the region is easily visible, the user can find an item that the user is likely to want to obtain information thereof more easily.

2. Second Embodiment

In the first embodiment, an item has been specified as the interest object. In contrast, in the second embodiment described below, a shop is specified as the interest object.

When a user browses a shop page, it is thought that the user is interested in a shop corresponding to the shop page browsed. An item related to a shop is an item sold by the shop. This is because an item sold by a shop that the user is interested in is also an item that the user is likely to be interested in. This is because the user may consider purchasing an item from the shop that the user is interested in.

The configuration of the information providing system S and the configuration and the detailed process of the online mall server 1 according to the second embodiment are basically the same as those of the first embodiment except for the interest object and the related item selecting method.

Figure 11:
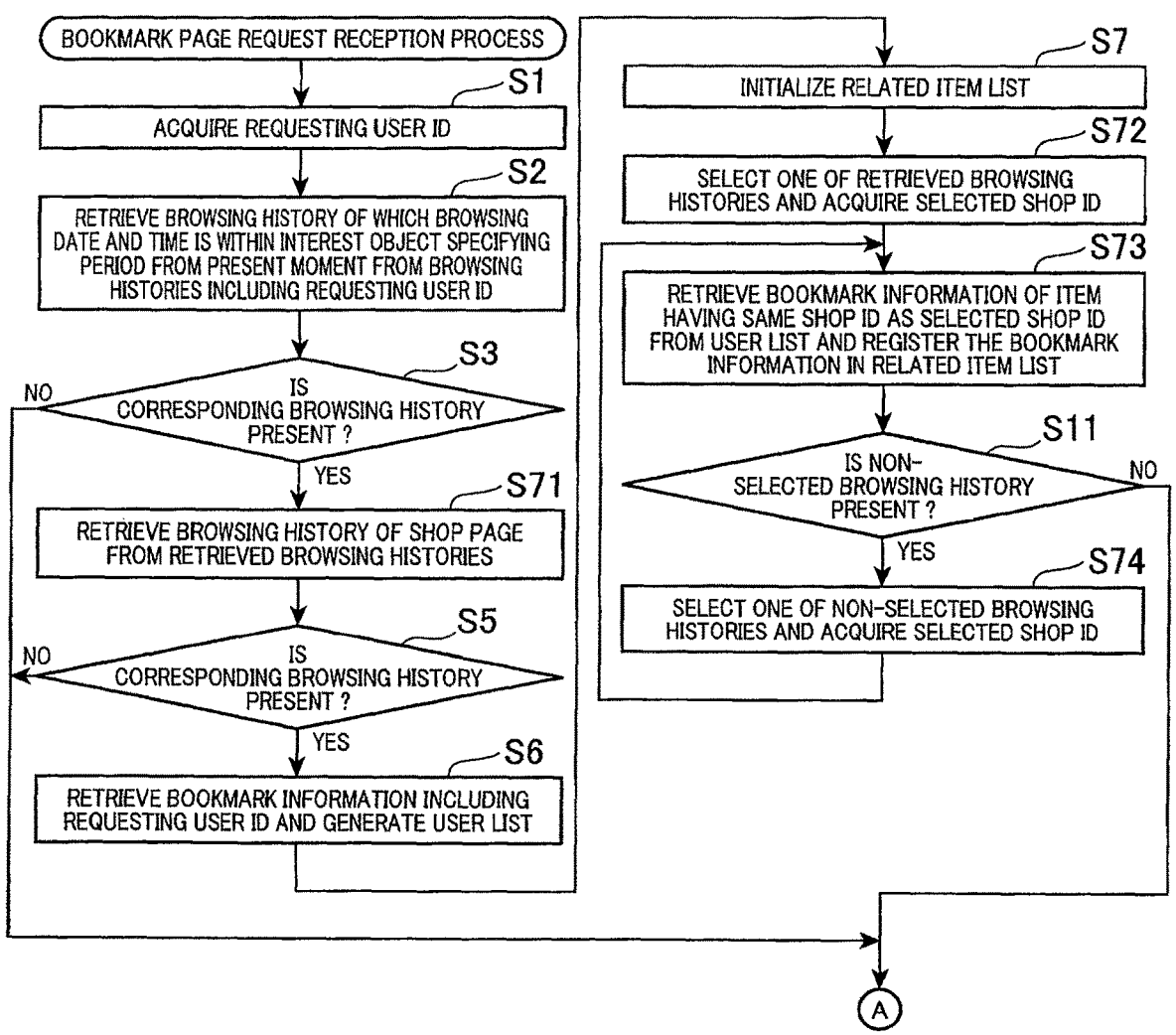
FIG. 11 is a flowchart illustrating a processing example of a bookmark page request reception process of a system control unit 14 of the online mall server 1 according to an embodiment.

FIG. 11 is a flowchart illustrating a processing example of a bookmark page request reception process of the system control unit 14 of the online mall server 1 according to the present embodiment. In FIG. 11, the same reference numerals are assigned to the same processes as FIG. 7. The processes of steps S31 to S43 are the same as the processes illustrated in FIG. 8.

As illustrated in FIG. 11, the system control unit 14 performs steps S1 to S3 similarly to the first embodiment. When it is determined in step S3 that it was possible to retrieve the corresponding browsing history (step S3: YES), the system control unit 14 retrieves a browsing history of a shop page among the retrieved browsing histories (step S71). Subsequently, the system control unit 14 performs steps S5 to S7 similarly to the first embodiment.

Subsequently, the system control unit 14 acquires a shop ID of a shop of which the shop page is browsed from the URL included in the selected browsing history as a selected shop ID (step S72). The shop indicated by the selected shop ID is one of the shops specified as the interest object. Subsequently, the system control unit 14 retrieves bookmark information of an item sold by the shop indicated by the selected shop ID from the user list (step S73). Specifically, the system control unit 14 acquires an item ID of an item registered in the bookmark from the respective pieces of bookmark information registered in the user list. Subsequently, the system control unit 14 acquires a shop ID from the item information corresponding to the acquired item ID. Subsequently, an item of which the acquired shop ID is identical to the selected shop ID is specified. Then, the system control unit 14 registers the bookmark information of the specified item in the related item list.

Subsequently, the system control unit 14 determines whether a browsing history that has not been selected is present among the browsing histories retrieved in step S71 (step S11). In this case, when it is determined that the browsing history that has not been selected is present (step S11: YES), the system control unit 14 selects one browsing history from the browsing histories that have not been selected. Then, the system control unit 14 acquires a shop ID from the selected browsing history as the selected shop ID (step S74). Subsequently, the system control unit 14 proceeds to step S73. On the other hand, when it is determined that all browsing histories have been selected (step S11: NO), the system control unit 14 performs steps S31 to S43 similarly to the first embodiment.

The system control unit 14 may exclude an item of which the browsing period of the shop page is shorter than the shortest browsing period from the interest object similarly to Application Example 2 of the first embodiment.

As described above, according to the present embodiment, the system control unit 14 of the online mall server 1 specifies a shop that the user is interested in as an interest object based on the browsing history stored in the storage unit 12, selects an item related to the shop specified as the interest object among items registered in the bookmark, and displays a bookmark list so that the bookmark item display region 100 of the selected item is displayed in such a display manner that the region is more easily visible than a display manner of the bookmark item display region 100 of an item that is not selected. Due to this, it is possible to allow the user to find an item that the user is likely to want to obtain information thereof among the items registered in the bookmark easily.

3. Third Embodiment

In the third embodiment described below, a search condition is specified as an interest object. A user designates a feature or an attribute of an item that the user is interested in as a search condition in order to search for items related to an item that the user may possibly be interested in from now on or an item that the user has been interested in and that has been registered in the bookmark. Thus, it can be thought that the user is interested in the search condition designated by the user. An item related to the designated search condition is an item that satisfies the search condition.

The configuration of the information providing system S and the configuration and the detailed process of the online mall server 1 according to the third embodiment are basically the same as those of the first embodiment except for the interest object and the related item selecting method.

Figure 12:
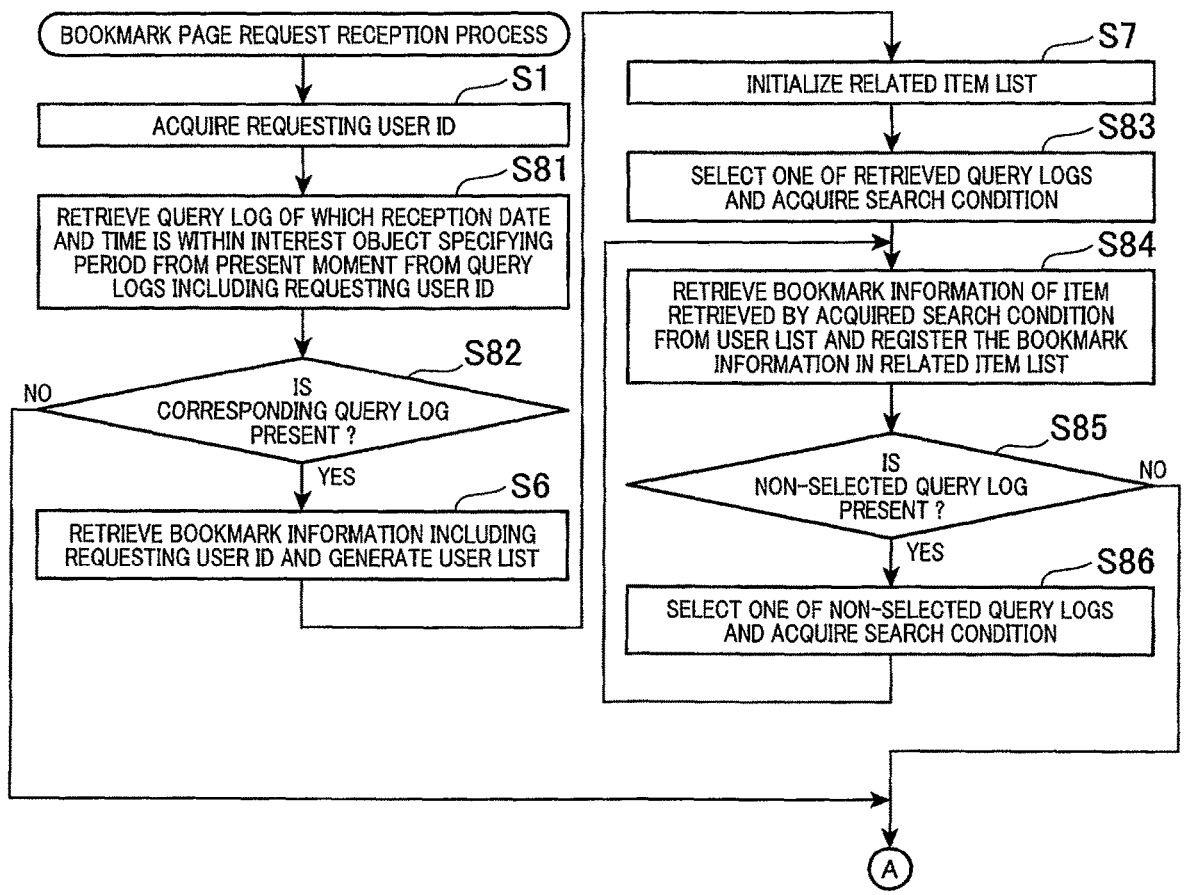
FIG. 12 is a flowchart illustrating a processing example of a bookmark page request reception process of a system control unit 14 of the online mall server 1 according to an embodiment.

FIG. 12 is a flowchart illustrating a processing example of a bookmark page request reception process of the system control unit 14 of the online mall server 1 according to the present embodiment. In FIG. 12, the same reference numerals are assigned to the same processes as FIG. 7. The processes of steps S31 to S43 are the same as the processes illustrated in FIG. 8.

As illustrated in FIG. 12, the system control unit 14 performs step S1 similarly to the first embodiment. Subsequently, the system control unit 14 retrieves a query log of which the reception date and time is included within the interest object specifying period from the present moment among the query logs that include the user ID as the requesting user ID from the query log DB 12e (step S81). The interest object specifying period is an example of a third period according to the present invention. The length of the interest object specifying period of the third embodiment may be the same as or different from the length of the interest object specifying period of the first embodiment. Subsequently, the system control unit 14 determines whether it was possible to retrieve the corresponding query log (step S82). In this case, when it is determined that it was not possible to retrieve the corresponding query log (step S82: NO), the system control unit 14 proceeds to step S31. On the other hand, when it is determined that it was possible to retrieve the corresponding query log (step S82: YES), the system control unit 14 performs steps S6 and S7 similarly to the first embodiment.

Subsequently, the system control unit 14 selects one query log from the retrieved query logs. Then, the system control unit 14 acquires search condition information from the selected query log (step S83). The acquired search condition information indicates one of the search conditions specified as the interest object. Subsequently, the system control unit 14 retrieves bookmark information of an item that satisfies the search condition indicated by the acquired search condition information from the user list (step S84). Specifically, the system control unit 14 acquires an item ID of an item registered in the bookmark from the respective pieces of bookmark information registered in the user list. Subsequently, the system control unit 14 acquires item information corresponding to the acquired item ID. When a keyword is designated as the search condition, the system control unit 14 retrieves an item of which at least one of the item name and the item description included in the item information includes the designated keyword. Moreover, when a genre is designated as the search condition, the system control unit 14 retrieves an item that belongs to the designated genre based on the genre ID included in the item information. When a plurality of search conditions is set, the system control unit 14 may retrieve an item that satisfies all search conditions and may retrieve an item that satisfies at least one search condition. The system control unit 14 registers the bookmark information of the retrieved item in the related item list.

Subsequently, the system control unit 14 determines whether a query log that has not been selected is present in the retrieved query logs (step S85). In this case, when it is determined that the query log that has not been selected is present (step S85: YES), the system control unit 14 selects one query log from the query logs that have not been selected. Then, the system control unit 14 acquires a search condition from the selected query log (step S86). Subsequently, the system control unit 14 proceeds to step S84. On the other hand, when it is determined that all query logs have been selected (step S85: NO), the system control unit 14 performs steps S31 to S43 similarly to the first embodiment.

As described above, according to the present embodiment, the system control unit 14 of the online mall server 1 specifies a search condition which has been designated within the interest object specifying period from the present moment as an interest object based on the query log stored in the storage unit 12, selects an item that can be retrieved by the search condition specified as the interest object among the items registered in the bookmark, and displays a bookmark list so that the bookmark item display region 100 of the selected item is displayed in such a display manner that the region is more easily visible than a display manner of the bookmark item display region 100 of an item that is not selected. Due to this, it is possible to allow the user to find an item that the user is likely to want to obtain information thereof among the items registered in the bookmark easily.

Two or more embodiments of the first to third embodiments may be combined. For example, an item, a shop, and a search condition may be specified as an interest object. Moreover, for example, only one of the item, the shop, and the search condition of which the browsing date and time or the reception date and time of the search request is the latest may be specified as the interest object.

Moreover, in the respective embodiments, the online mall server 1 controls the display rank as the display manner of the item display region 100. However, the online mall server 1 may control, as the display manner, the size of the item display region 100, the size or thickness of characters in the item display region 100, the color, transparency, or the like of characters in the item display region 100, for example, so that the display manner of the item display region 100 of the related item is changed to such a display manner that the region is relatively easily visible and that a display manner of the item display region 100 of an item that is not the related item is changed to such a display manner that the region is relatively difficult to be visible.

Moreover, in the respective embodiments, the present invention is applied to the display manner of information of the respective bookmark items in the bookmark page. However, the present invention may be applied to a display manner of the browsing histories in a browsing history page. The browsing history page is a web page that displays a browsing history of an item page. Specifically, an item name of an item of which the item page is browsed, a shop name of a seller's shop of the item, an image of the item, the price of the item, and the like are displayed. The link to the corresponding item page is embedded in the item name and the item image. Thus, when a user selects the item name or the item image, the user can display the corresponding item page. Respective pieces of information on the respective items of which the item pages are browsed are basically displayed in descending order of browsing date and time. On the other hand, for example, when an interest object is specified and a related item of the interest object is selected, the browsing history page is displayed so that a display rank of information on the related item is higher than a display rank of information on an item that is not the related item. Moreover, for example, the earlier the browsing date and time of the item page of a related item, the higher the display rank of the information on the related item. The details of the bookmark page request reception process are basically the same as the first embodiment except that a target web page is a browsing history page rather than the bookmark page, and the information used for selecting the related item is the browsing history rather than the bookmark information.

Moreover, in the respective embodiments, the transaction object of the present invention is applied to an item. However, the transaction object may be applied to a service. Moreover, the present invention may be applied to a system in which reservation of services can be made as an electronic commerce system. Examples of service reservations include reservation of lodging facilities, reservation of athletic facilities such as golf links, and reservation of seats of transportation facilities. Moreover, the interest object may be applied to a service, a service providing facility, a service provider, and the like.

REFERENCE SIGN LIST 1 online mall server
2 shop terminal
3 user terminal
11 communication unit
12 storage unit
12a membership information DB
12b genre information DB
12c shop information DB
12d item information DB
12e query log DB
12f browsing history DB
12g bookmark information DB
13 input/output interface
14 system control unit
14a CPU
14b ROM
14c RAM
15 system bus
NW network
S information providing system

The invention claimed is:

1. An information processing apparatus, comprising:
at least one memory operable to store program code; and
at least one processor operable to read said program code and operate as instructed by said program code, said program code comprising:
adding code configured to cause at least one of said at least one processor to add, to a reference list of a user, a first transaction object through a first action performed on the first transaction object by the user, the reference list comprising a list of first transaction objects added to the reference list through first actions of the same type performed on the first transaction objects by the user;
identifying code, selecting code, and controlling code, wherein, in response to receiving a request from the user for a reference list page, the reference list page containing the list of the first transaction objects included in the reference list that preexists before receiving the request from the user for the reference list page,
the identifying code causes at least one of said at least one processor to identify an interest object of the user, based on a history of second actions of the same type that are performed on second transaction objects by the user, the second actions being independent from the first actions and not updating the reference list, the second transaction objects being of the same type as the first transaction objects;
the selecting code causes at least one of said at least one processor to select, from the reference list, at least one of the first transaction objects that is related to the identified interest object; and
the controlling code causes at least one of said at least one processor to control display of the reference list page so that the selected at least one of the first transaction objects is visually prioritized over at least another one of the first transaction objects that is not selected by the selecting code.

2. The information processing apparatus according to claim 1, wherein the identifying code causes at least one of said at least one processor to identify, as the interest object, one of the second transaction objects of which second information is browsed within a second predetermined time period from a present time, based on the history of the second actions.

3. The information processing apparatus according to claim 2, wherein the selecting code causes at least one of said at least one processor to not select the at least other one of the first transaction objects of which first information is displayed for less than a first predetermined time period.

4. The information processing apparatus according to claim 1, wherein the controlling code causes at least one of said at least one processor to display the reference list in which the selected at least one of the first transaction objects are prioritized based on whether the user browsed transaction object information corresponding to the selected at least one of the first transaction objects.

5. The information processing apparatus according to claim 1, wherein the controlling code causes at least one of said at least one processor to display the reference list in which the selected at least one of the first transaction objects are prioritized based on a registration time of the selected at least one of the first transaction objects.

6. The information processing apparatus according to claim 1, wherein the selected at least one of the first transaction objects is at least one first transaction object of which a transaction term for purchase is more advantageous to the user than a corresponding transaction term for purchase of the identified interest object.

7. The information processing apparatus according to claim 1, wherein the identifying code causes at least one of said at least one processor to identify, as the interest object, a search condition that is designated within a predetermined period from a present time.

8. The information processing apparatus according to claim 2, wherein the controlling code causes at least one of said at least one processor to display the reference list in which the selected at least one of the first transaction objects are prioritized based on a registration time of the selected at least one of the first transaction objects.

9. The information processing apparatus according to claim 3, wherein the controlling code causes at least one of said at least one processor to display the reference list in which the selected at least one of the first transaction objects are prioritized based on a registration time of the selected at least one of the first transaction objects.

10. The information processing apparatus according to claim 2, wherein the selecting code causes at least one of said at least one processor to select, from the reference list, the at least one of the first transaction objects, based on a comparison of transaction conditions of the first transaction objects.

11. The information processing apparatus according to claim 3, wherein the selecting code causes at least one of said at least one processor to select, from the reference list, the at least one of the first transaction objects, based on a comparison of transaction conditions of the first transaction objects.

12. The information processing apparatus according to claim 4, wherein the selecting code causes at least one of said at least one processor to select, from the reference list, the at least one of the first transaction objects, based on a comparison of transaction conditions of the first transaction objects.

13. The information processing apparatus according to claim 5, wherein the selecting code causes at least one of said at least one processor to select, from the reference list, the at least one of the first transaction objects, based on a comparison of transaction conditions of the first transaction objects.

14. The information processing apparatus according to claim 1, wherein the selected at least one of the first transaction objects is different from the identified interest object.

15. The information processing apparatus according to claim 1, wherein the reference list is generated by manually registering the first transaction objects by the user.

16. The information processing apparatus according to claim 15, wherein the reference list is either one or both of a list of user selected bookmarks and a list of user selected favorites.

17. The information processing apparatus according to claim 1, wherein the controlling code causes at least one of said at least one processor to display the reference list, in response to a third action that is performed by the user to request the reference list.

18. The information processing apparatus according to claim 1, wherein
only when no interest object of the user is identified by the identifying code, the controlling code causes at least one of said at least one processor to control the display of the reference list page so that the first transaction objects on the reference list are arranged in a predetermined order independently of the selecting code.

19. The information processing apparatus according to claim 1,
wherein when there are a first plurality of the first transaction objects that are selected by the selecting code and a second plurality of the first transaction objects not selected by the selecting code, the controlling code causes at least one of said at least one processor to control the display of the reference list so that the selected first plurality of the first transaction objects are displayed at higher display ranks and arranged in a first predetermined order therebetween and the non-selected second plurality of the first transaction objects are displayed at lower display ranks and arranged in a second predetermined order that is different from the first predetermined order.

20. The information processing apparatus according to claim 1,
wherein the identifying code causes at least one of said at least one processor to identify a shop as the interest object, based on a history of the user browsing shop pages, and the selecting code causes at least one of said at least one processor to select, from the reference list, at least one of the first transaction objects that is sold by the identified shop.

21. The information processing apparatus according to claim 1, wherein the second transaction objects are items to be purchased or services to be purchased.

22. The information processing apparatus according to claim 21, wherein the items or the services can be purchased by the user in an online mall.

23. The information processing apparatus according to claim 1, wherein, for each of the first transaction objects included in the reference list, a genre identification (ID) and a genre level are predefined in a genre ID database, and the selecting code causes at least one of said at least one processor to:
obtain a genre ID and a genre level corresponding to the interest object by referring to the genre ID database, and
select the at least one of the first transaction objects that belongs to the same genre ID of the interest object or has a parent genre ID corresponding to one or more genre levels that are lower than the genre level of the interest object, a lower genre level indicating a parent genre to a genre with a higher genre level.

24. The information processing apparatus according to claim 1, wherein the controlling code causes at least one of said at least one processor to adjust a range of items related to the interest object so that a number of the selected at least one of the first transaction objects is a predetermined maximum number or smaller.

25. The information processing apparatus according to claim 24, wherein the predetermined maximum number may be the same as a maximum number of display hits of the reference list page.

26. An information processing method, which is performed by an information processing apparatus, comprising:
adding, to a reference list of a user, a first transaction object through a first action performed on the first transaction object by the user, the reference list comprising a list of first transaction objects added to the reference list through first actions of the same type performed on the first transaction objects by the user;
in response to receiving a request from the user for a reference list page, the reference list page containing the list of the first transaction objects included in the reference list that preexists before receiving the request from the user for the reference list page, performing the following operations:
identifying an interest object of the user, based on a history of second actions of the same type that are performed on second transaction objects by the user the second actions being independent from the first actions and not updating the reference list, the second transaction objects being of the same type as the first transaction objects;

selecting, from the reference list, at least one of the first transaction objects that is related to the identified interest object; and controlling display of the reference list page so that the selected at least one of the first transaction objects is visually prioritized over at least another one of the first transaction objects that is not selected by the selecting.

27. The information processing method according to claim 26, wherein the selected at least one of the first transaction objects is different from the identified interest object.

28. The information processing method according to claim 26, wherein the reference list is generated by manually registering the first transaction objects by the user.

29. The information processing method according to claim 28, wherein the reference list is either one or both of a list of user selected bookmarks and a list of user selected favorites.

* * * * *